United States Patent [19]

McReynolds

[11] 4,159,623
[45] Jul. 3, 1979

[54] AUTOMOTIVE STEP-TURBINE ENGINE

[76] Inventor: William W. McReynolds, 6148 Elsa St., Lakewood, Calif. 90713

[21] Appl. No.: 849,336

[22] Filed: Nov. 7, 1977

[51] Int. Cl.² .......................... F02C 7/02; F02D 25/00
[52] U.S. Cl. .............................. 60/39.15; 60/39.51 R; 60/39.82 S; 60/39.82 N; 60/709; 60/718; 180/54 C
[58] Field of Search .................. 60/39.03, 39.15, 709, 60/711, 716, 718, 719, 720, 39.28 P; 180/54 C, 66 A; 74/61

[56] References Cited

U.S. PATENT DOCUMENTS

| | | | |
|---|---|---|---|
| 2,419,810 | 4/1947 | Beall ........................................ | 60/709 |
| 3,020,711 | 2/1962 | Pinnes ..................................... | 60/39.15 |
| 3,307,351 | 3/1967 | Wheeler et al. ....................... | 60/39.15 |
| 3,869,862 | 3/1975 | Dickey ................................... | 180/66 A |
| 4,027,485 | 6/1977 | Wallis ..................................... | 60/718 |

*Primary Examiner*—Louis J. Casaregola
*Attorney, Agent, or Firm*—Charles A. Goodall

[57] ABSTRACT

An automotive step-turbine engine comprising in combination a primary power turbine assembly, one or more power boost turbine assemblies and a power output demand sensor for sequentially placing in service the one or more power boost assemblies as additional power output above that capable of being economically produced by the primary power turbine assembly is required further sequentially taking the power boost turbine assemblies out of service in reverse order when the additional power is no longer required. The primary power turbine assembly and the power boost turbine assemblies are geared together synchronously and run at the same velocity. The assemblies each have an air compressor unit geared directly to the respective assembly for pumping air into burner units, one for each of the assemblies. The power boost compressors have air intake ports having port valves therein for opening the port when each power boost turbine assembly is placed into service and closing the port when each power boost turbine assembly is taken out of service. When not in service, the power turbine assembly rotating members rotate in a near vacuum thereby substantially reducing the frictional drag on the rotating members and increasing the efficiency of the engine. Opening the air intake port valves and fuel inlet valves to permit air and fuel to flow into a burner wherein the air-fuel mixture is ignited by an electrically operated igniter places the power boost turbine assemblies in service. The rotational velocity of the turbine engine's rotating members including each turbine wheel is maintained between lower and upper rotational velocity limits defining an economical operating range for the engine with minimal power surges occurring when each power boost assembly is placed into or taken out of service as determined by the power output demand sensor.

29 Claims, 37 Drawing Figures

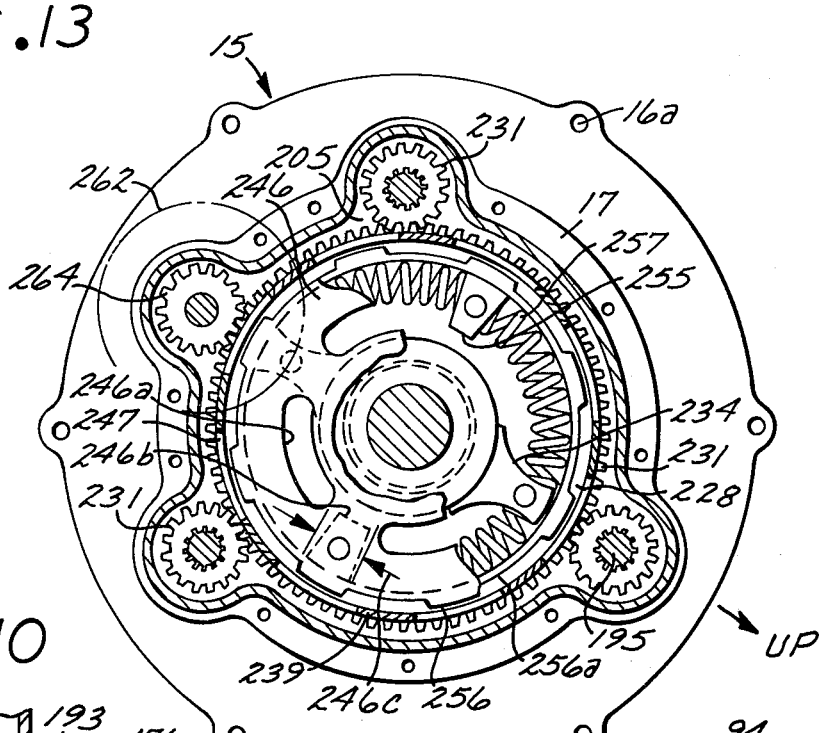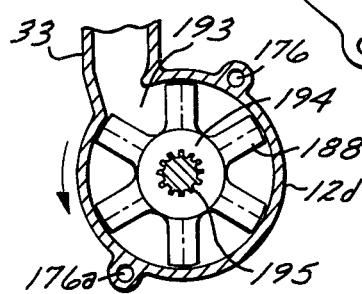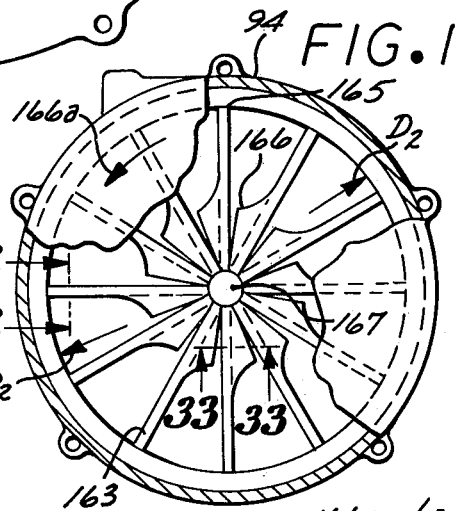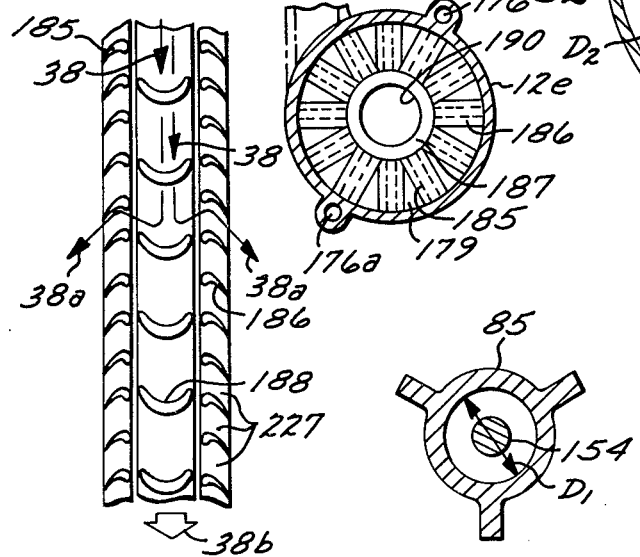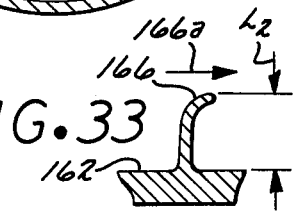

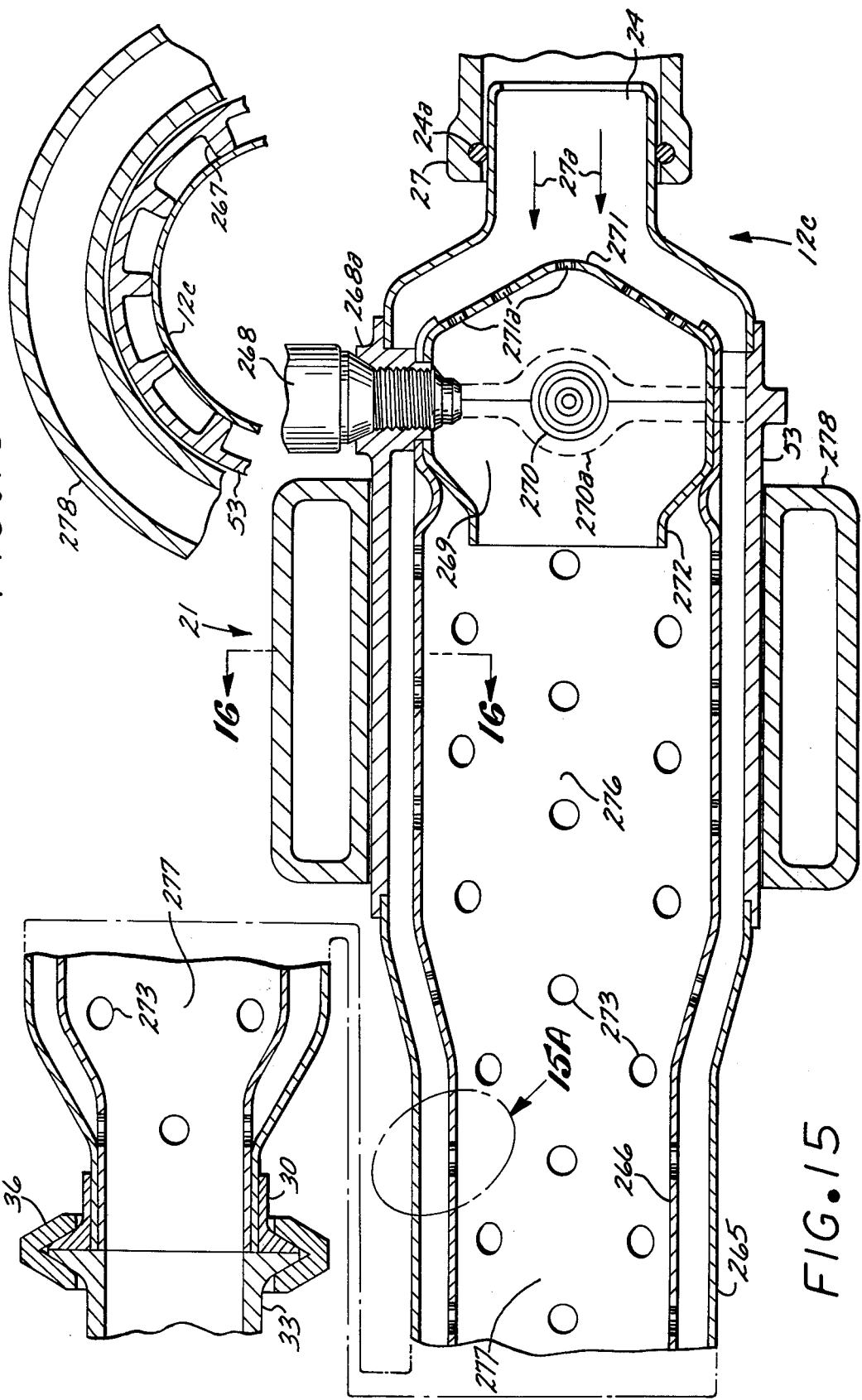

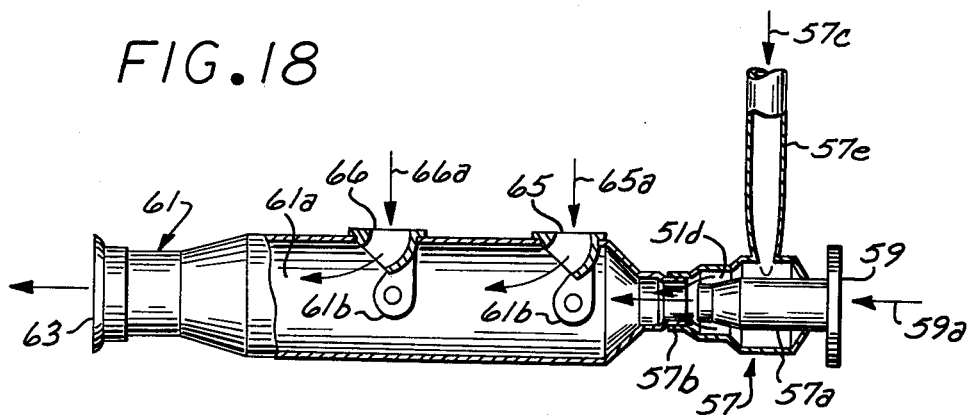
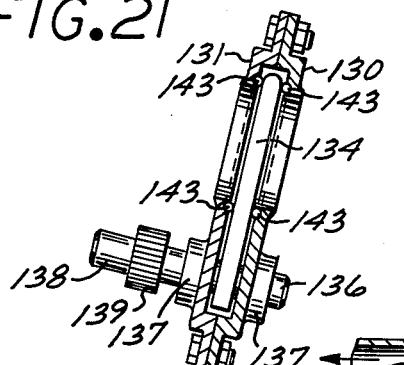
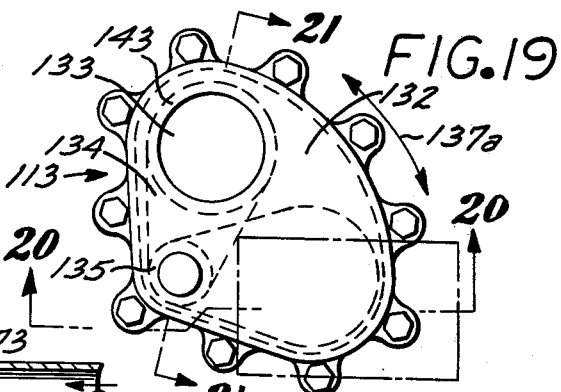
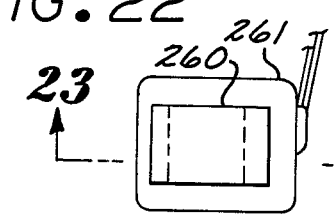
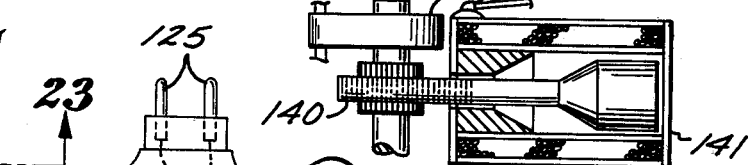
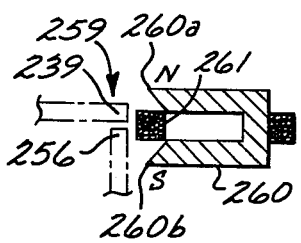
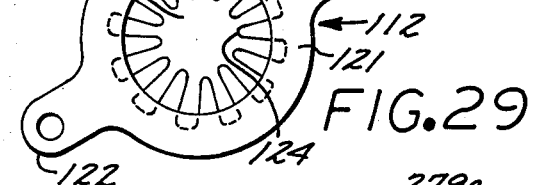
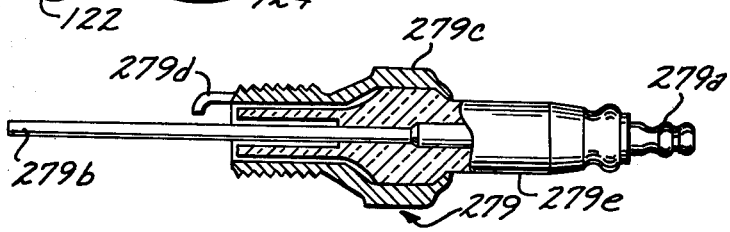

AUTOMOTIVE STEP-TURBINE ENGINE

BACKGROUND OF THE INVENTION

1. Field of Invention

This invention relates to automotive turbine engines and more particularly to a new and novel automotive step-turbine engine having in combination a primary power turbine assembly, one or more power boost turbine assemblies, and a sensor means for sequentially placing the power boost turbine assemblies in service for providing additional power to the engine over that provided by the primary power assembly as required to meet power demand as sensed by a power demand sensor means being a component part of the engine. Each of the assemblies have an air compressor coupled through an air duct to burner cans, each burner can having an electrically operated igniter means for igniting an air-fuel mixture inside the burner can and a fuel supply means for delivering fuel into the can for mixing therein with air delivered by the compressor. The fuel supply means includes a fuel pump and a fuel-regulating valve in combination for regulating the fuel flow into the burner can, said valve being controlled by the power demand said sensor means through an electrical control system actuated by the power demand said sensor means. The electrical control system thereby maintaining the rotational velocities of the rotating members within a range of velocities within which economical engine performance is achieved as power demand increases or decreases as sensed by said sensor means. The power boost turbine assemblies once placed in service are sequentially taken out of service in reverse order to that in which they were placed in service by the power demand sensor means when power output demand is reduced to the level at which the power boost turbine assemblies are no longer needed by the primary turbine assembly to maintain economical engine performance. A starter means and a pollutant reducing exhaust flow means are also included in the combination.

2. Discussion of Prior Art

In recent years turbine engines have found wide acceptance as power units for aircraft, marine and stationary application. Turbine engines have been used with some success in the automotive field, but have not received wide acceptance because of the high cost of production, high fuel consumption and emission control problems.

Turbines employed in turbine engines are reactive devices and are not positive containment or compression devices as is the case with most internal combustion engines currently employed in automotive engines. Turbine blade speed or rotational velocity of the turbine wheel is very critical in turbine powered engines presently in use. Generally this velocity must be kept within plus or minus ten percent of the optimized rating of the turbine blade speed and in general this is not possible in engines currently being investigated for automotive applications. Presently used engines are not economical to operate because of blade speed of the turbine is not held within the critical tolerances when engine power change requirements occur. Prior art turbine engines generally must be designed for specific load requirements commensurate with the economical turbine blade speed range. These turbines are not operated economically at power requirements which cause the turbine blade speed to vary outside the designed limits and are generally not economically adapted to varying load condition requirements of automotive uses. Turbine engines currently available for automotive use generally rely upon continuous running compressors for providing and controlling the air intake into a combustion chamber and a fuel intake control system for controlling the fuel intake to the combustion chamber. These engines generally suffer from severe time lag in providing increased power output on demand and conversely, an excessive time lag is experienced when power demand is reduced. These requirements extrapolate into relatively expensive manufacturing costs for automotive turbine engines described in prior art. The present invention overcomes the disadvantages of the prior art automotive turbine engines in that the optimum turbine rotational velocity is maintained by selectively activating the deactivating successively power boost turbine assemblies to provide additional power in combination with a continuously operating primary power turbine assembly. The additional power boost turbine assemblies are activated or de-activated automatically by an electrical control system actuated by a power demand sensor means successively as the drive shaft load increases or decreases respectively and the minimum power requirements are provided by the primary power turbine assembly.

The rotating parts in each of the power assemblies performing similar functions rotate in synchronism at the same rotational velocity and the power boost turbine rotating parts rotate in a near vacuum when the power boost turbine is not in service thus reducing the frictional drag of these rotating parts to a very low value. This feature also substantially eliminating power surges when the power boost turbine assemblies are placed in or taken out of service as determined by the power demand sensor.

Furthermore, the engine of the present invention provides greater economy than is available in prior art engines because the turbine blade speed is maintained within the range of greatest economy of opeation at all power demands for which the engine is designed to operate as an automotive engine and the maximum power demand operating range is determined by the number of power boost turbine assemblies employed to provide increased power over that provided by the primary power turbine assembly.

SUMMARY OF THE INVENTION

A primary object of the present invention is to provide an automotive step-turbine engine comprising in combination a primary power turbine assembly for providing normal continuous operating power to a power output drive shaft, one or more additional power boost turbine assemblies geared to the primary power turbine assembly and output drive shaft providing for rotation of all rotating members synchronously at the same rotational velocity with respect to the rotating members of the primary power turbine assembly and a power demand sensor means for sequentially placing the one or more power boost turbine assemblies in service or removing said power boost turbine assemblies from service in accordance with power demands evidenced by changes in torque load requirements at an output drive shaft. Other objects of the invention are to provide as follows:

1. A step-turbine engine having minimal power surges when power boost turbine assemblies are placed in and taken out of service.

2. A step-turbine engine wherein rotating parts of out-of-service power boost turbine assemblies rotate in a near vacuum thereby substantially eliminating frictional drag from a power boost turbine assembly compressor rotor and turbine wheel portions of said assembly which would occur otherwise.

3. A step-turbine engine having a primary power turbine assembly and one or more power boost turbine assemblies having substantially identical construction providing for economical manufacture of the engine.

4. A step-tubine engine which has sealed lubricant bearings and requires little or no other lubrication and further requiring no special cooling provisions such as a cooling fan assembly or a fluid radiator.

5. An economical low emission automotive step-turbine engine having general use on vehicles and particularly being adaptable for use on buses, trucks, tractors, automobiles, and railroad locomotives.

6. A step-turbine engine wherein all turbines and associated compressors operate at the same rotational velocity.

7. A step-turbine engine having a large power range with economical operation throughout the power range.

8. A step-turbine engine having simplified turbine construction in that each turbine unit has only one rotating wheel with a fixed vane assembly on each side thereof.

9. A step-turbine engine wherein the multi-turbine combination controls the optimum R.P.M. to within ±10% and still maintains the required output torque.

10. A step-turbine engine wherein power boost turbine assemblies are in stand-by operation without providing power until required.

11. A step-turbine engine utilizing electrically driven fuel pump, ignition reluctor means, and other accessories normally required to be driven by mechanically coupling to the engine drive chain therefore requiring no timing chain or other gear drive therefor.

BRIEF DESCRIPTION OF THE DRAWINGS

FIG. 10 is a cross-sectional view taken along line 10—10 of FIG. 9 showing a power turbine portion of a turbine assembly.

FIG. 11 is a cross-sectional view taken along line 11—11 of FIG. 9.

FIG. 12 is a cross-sectional view taken along line 12—12 of FIG. 9 showing a compressor wheel mounted within a compressor housing on a turbine shaft at a shaft compressor end.

FIG. 13 is a cross-sectional view of a reduction gear housing of a three turbine engine having one primary turbine assembly and two power boost turbine assemblies taken back of line 13—13 of FIG. 9 showing a torque sensor mechanism, enclosed within the housing.

FIG. 14 is a cross-sectional view of a turbine of this invention taken along line 14—14 of FIG. 9.

FIG. 15 is a cross-sectional view of a burner can assembly of this invention.

FIG. 15A is a cross-sectional view of a typical burner can air inlet port taken at inset 15A of FIG. 15.

FIG. 16 is a cross-sectional view of the burner can assembly of FIG. 15 taken along line 16—16 of FIG. 15.

FIG. 17 is a view of the unwrapped periphery of the turbine wheel and the fixed vane assemblies taken at right angles to line 10—10 of the turbine in FIG. 9 and looking down on the turbine wheel and the fixed vane assemblies showing a six bladed turbine wheel and two twelve vaned fixed vane assemblies, one on each side of the turbine wheel.

FIG. 18 is a cross-sectional view of an emission control reactor assembly for use with the engine of this invention.

FIG. 19 is a plan view of a compressor shut-off valve of a power boost turbine assembly shown on the forward end of FIG. 9 having phantom lines showing valve construction.

FIG. 20 is a cross-sectional view taken along line 20—20 of FIG. 19 showing an air inlet valve control means.

FIG. 21 is a cross-sectional view taken along line 21—21 of FIG. 19 showing an air inlet, valve seat, and valve plate configuration of the invention.

FIG. 22 is a plan view of a magnetic pick-up for sensing changes in orientation of the pole pieces of the power demand sensor means thereby sensing torque changes in the power output drive shaft.

FIG. 23 is a cross-sectional view taken along line 23—23 of FIG. 22 and shows the relative orientation of the pick-up and pole pieces of the power demand sensor means.

FIG. 24 is a cross-sectional view of a spark plug for igniting continuously the air-mixture within the burner can shown in FIG. 15.

FIG. 29 is a plan view of a primary turbine start-up preheater unit for use with the engine of this invention.

FIG. 32 is a cross-sectional view taken along line 32—32 of FIG. 12.

FIG. 33 is a cross-sectional view taken along line 33—33 of FIG. 12.

DESCRIPTION OF PREFERRED EMBODIMENTS

General Descriptive Considerations

Figure 1:
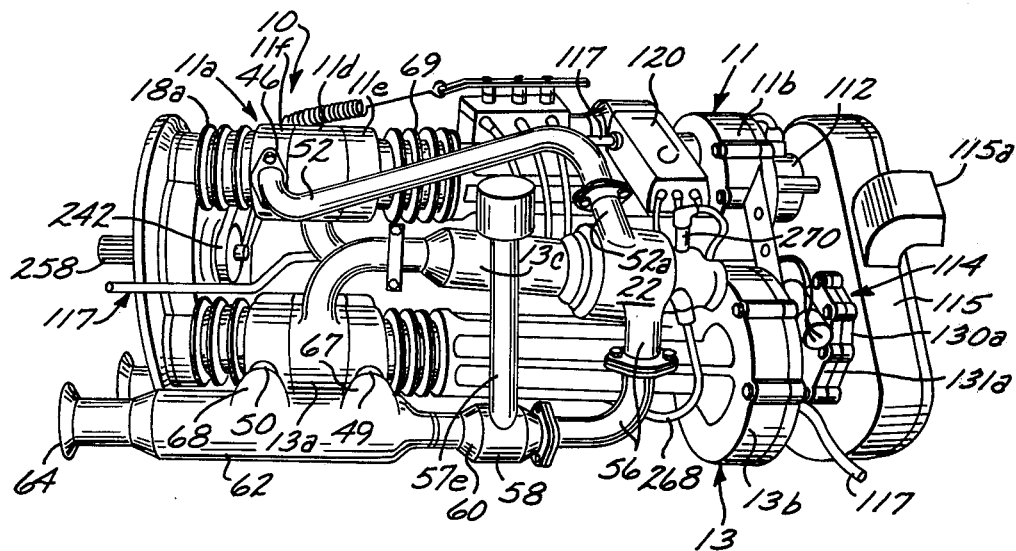
FIG. 1 is a perspective view of a step turbine engine embodying the present invention viewed from the left side, showing a typical construction of an engine having a primary power turbine assembly and two power boost turbine assemblies and the required auxiliary components of the combination.
Figure 2:
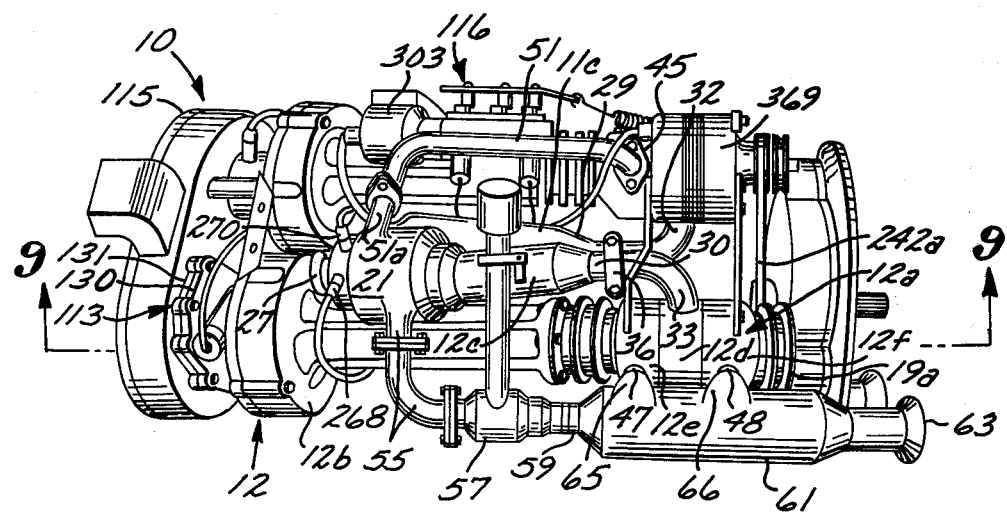
FIG. 2 is a perspective view of the right side of the engine shown in FIG. 1.
Figure 3:
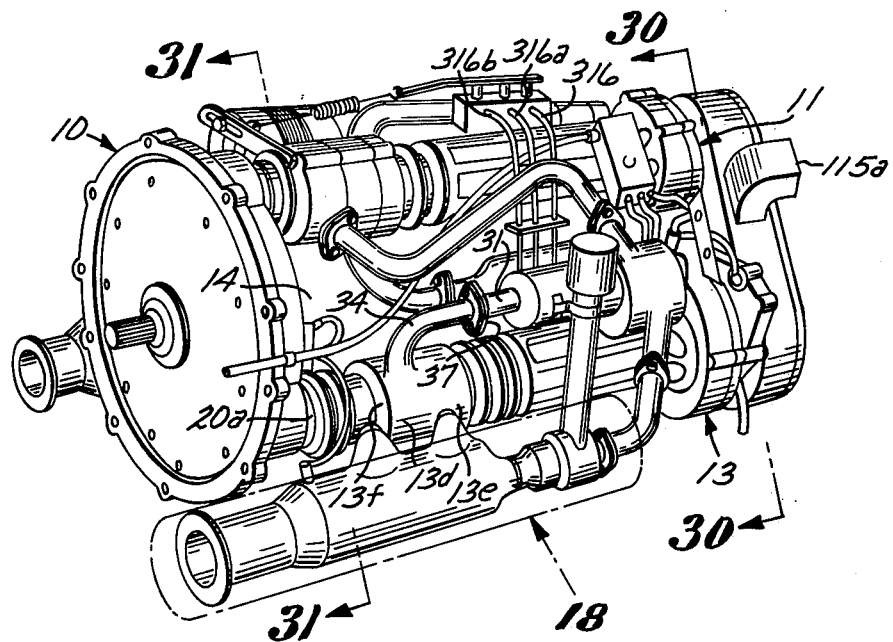
FIG. 3 is a perspective view of the engine shown in FIG. 1 looking forward from the rear of the engine showing among other components a power drive shaft coupling member and a reduction gear chamber rear cover plate.
Figure 4:
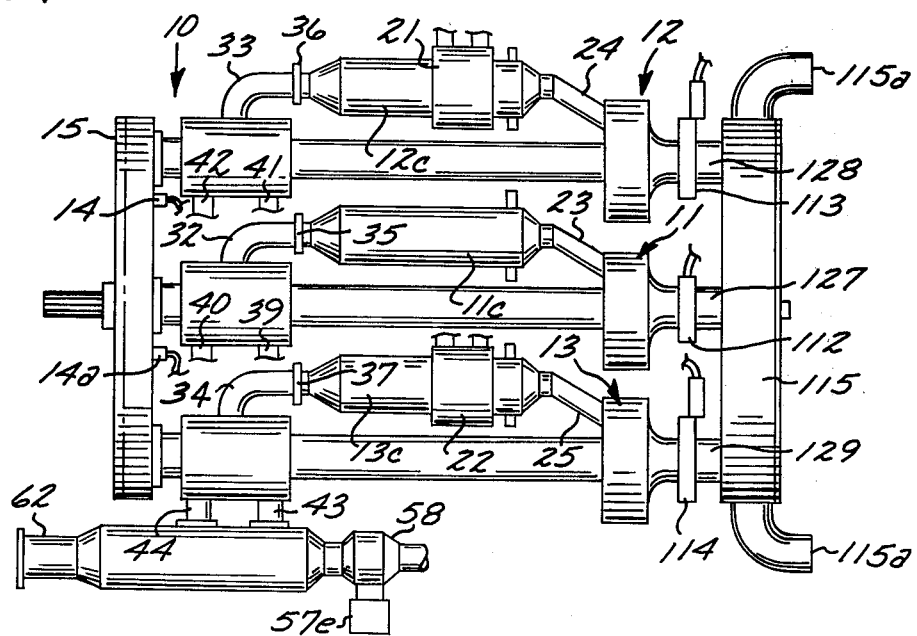
FIG. 4 is a block diagram of the engine shown in FIGS. 1, 2, and 3 showing the main features of the three turbine step-turbine engine embodiment of the invention.

A preferred embodiment of an automotive step-turbine engine of the present invention is illustrated in the accompanying drawings and is identified generally by the reference character 10. FIGS. 1, 2 and 3 are perspective views showing a preferred arrangement of an assembled engine. FIG. 4 is a block diagram depicting schematically the arrangement of the major components of the engine shown in FIGS. 1, 2, and 3. Constructional details are shown generally in FIGS. 5 through 33. While a three turbine engine is illustrated and described herein, the invention includes a step-turbine engine having at least one primary turbine assembly and one or more power boost turbine assemblies depending upon the power requirements for the particular application, the number of turbine assemblies being limited only by the size of the engine. The power transmission means for transferring power from the engine is not shown and may be any conventional transmission means and differential gear adapted to the particular automotive application. The engine may be mounted on an automotive vehicle conventionally or in any other convenient manner depending upon the engine size and application.

Throughout this discussion where three numbers are used in sequence to identify the identical parts of the three assemblies, primary turbine assembly 11, first power boost assembly 12, and second power boost assembly 13, the first number identifies that part on the primary power turbine assembly 11, the second number identifies that part of the first power boost turbine assembly 12, and the third number identifies that part on the second power boost turbine assembly 13. Where two numbers are used in sequence to identify identical parts on the first and second power boost turbine assemblies 12, 13, the first number is applicable to the first power boost assembly part and the second number to the second power boost assembly part. Where parts on the three assemblies are identically constructed, only one numeral designating the part will in general be used on the drawings and the other two numbers used in the discussion will be that same part on the other assemblies. In general, where parts are identical, the first power boost assembly 12 drawings, where applicable, will be used to describe the mechanical features of the engine 10. The discussion concerning the assembly of the engine 10 (FIGS. 1, 2 and 3) will necessarily involve other mechanical features and requires additional identifying numerals.

The embodiment shown and discussed herein comprises the automotive step-turbine engine 10 having one primary turbine assembly 11, the first power boost turbine assembly 12, the second power boost turbine assembly 13, a power output demand sensor means (to be identified and described later) and component parts generally required for a functioning automotive gas turbine engine to be described and identified individually hereinbelow. Various mechanical components comprising a torque sensor output demand sensor 14 are shown in the engine block diagram in FIG. 4, and in FIGS. 3, 13, 22, 23 and 31 and the electrical concepts are described in the schematic circuit of FIG. 5. The power output demand sensor 14 is for sequentially placing the power boost turbine assemblies in service when additional power is required and taking them out of service when additional power is no longer required. The power demand sensor 14 will be more fully described and discussed in conjunction with the description of the engine and operation thereof later. The engine also has a turbine overspeed control 14a (see FIGS. 4, 9, 13, 22, 23 and 31 for mechanical details and FIG. 5 for the electrical description.) The overspeed control 14a will be discussed when the engine operation is described.

ENGINE ARRANGEMENT AND SUPPORTING STRUCTURE

Referring to FIGS. 1, 2, 3, and 4 an assembled engine 10 is shown. While the engine could be assembled in other ways and still be within the concepts of this invention, the embodiment shown herein is compact and well suited to automotive applications. The embodiment shown and described herein has a rear gear reduction assembly housing 15 formed by bolting a rear housing plate to a front gear reduction housing member 17 by bolt means 17a. There is a gear reduction housing seal gasket 373 mounted between the rear housing plate and the front gear reduction housing member. This housing 15 also provides an oil sump in a bottom portion 17b thereof for lubricating rotating parts therein. A vehicle transmission housing (not shown) may be bolted to the rear housing plate 16 through bolt holes 16a (see FIG. 13) spaced around the periphery thereof. The front gear reduction housing member 17 provides three rear mounting flanges 18, 19, 20 spaced uniformly around the housing member 17 at 120° intervals for mounting thereonto a primary turbine rear flange 18a to a top rear mounting flange 18 (the top mounting flange as shown), a first (right) power boost turbine rear flange 19a to a right rear mounting flange 19 and a second (left) power boost turbine rear flange 20a to a (left) rear mounting flange 20. Each of the flanges 18, 19, 20 have turbine mounting bolt holes 370 (see FIGS. 9c and 31) which mate with turbine mounting flange threaded bolt holes 371 (see typical arrangement in FIG. 9C) and the turbine flange and rear mounting flange for each assembly are bolted together with turbine mounting bolts 372 and have a turbine mounting seal gasket 19b mounted therebetween. The three assemblies 11, 12, 13 each comprise in combination a gas turbine (primary gas turbine 11a, first power boost turbine 12a, and second power boost turbine 13a), a radial flow centrifuge type compressor 11b, 12b, 13b and an air-fuel mixture burner can assembly, 11c, 12c, 13c, said burner cans for the first and second power boost assemblies 12, 13 have burner can exhaust heat exchange heaters 21, 22 while the primary power assembly 11 does not have a burner can heater, together with associated components (to be discussed later) required to make the engine 10 function. The burner cans 11c, 12c, 13c have air inlet ducts 23, 24, 25 sealably inserted into compressor outlet ducts 26, 27, 28 having duct seals 23a, 24a, 25a therebetween, for directing compressed air from the compressors into the burner cans (see arrow 27a in FIG. 9A). The cans further have high velocity heated gas outlet ducts 29, 30, 31 sealably clamped to turbine inlet ducts 32, 33, 34 with clamp means 35, 36, 37 for directing a high velocity heated gas 38 (see arrow 38 in FIGS. 9B and 17) from the burner cans into the respective turbines. The gas 38 impinges upon the turbine blades and force the turbine wheel 189 to rotate in the direction of the arrow 38b. Each turbine 11a, 12a, 13a has a forward and rear exhaust outlet duct (primary turbine ducts 39, 40, (see FIG. 4) first power boost turbine ducts 41, 42, (see FIGS. 4 and 9) and second power boost turbine ducts 43, 44), (see FIG. 4) for directing exhaust gas therefrom (see arrows 38a in FIG. 9B). The inlet ducts are intermediate said forward and rear exhaust ducts. Each of the exhaust ducts have flanged coupling means (primary coupling means 45, 46, first coupling means 47, 48, and second coupling means 49, 50). The primary exhaust duct coupling means 45, 46 are coupled to first and second exhaust heater ducts 51, 52, said ducts further being coupled respectively to first and second burner can heater inlet ducts 51a, 52a. The heaters 21, 22 encircle the first and second heater cans 12c, 13c respectively around an expansion chamber housing portion 53, 54 thereof, said heaters 21, 22 further respectively have flanged outlet ducts 55, 56 sealably attached to first and second reactor first venturi assembly inlet ducts 57, 58. The first inlet duct is further sealably attached to reactor first inlets 59, 60 for directing exhaust gas from the primary turbine through the respective burner can heaters and into first and second exhaust reactors 61, 62 respectively. The exhaust enters the reactor through a venturi tube 57a, 58a and passes through a reactor necked-down air-exhaust mixing portion 57b, 58b and thence into the reactor 61, 62. Air (arrow 57c 58c) is drawn into an air distribution portion 57d, 58d through a supplemental air inlet tube 57e, 58e by venturi action of the exhaust gas (arrow 59a, 60a) for mixing with the exhaust gases and to permit more complete oxidation thereof in a reactor exhaust after-burner portion 61a, 62a for pollution control. Internal to the reactor and adjacent to each of the said second and third inlets is a heat retaining and diffuser lug 61b, 62b for improving the oxidation of the exhaust within the reactor after-burner portion. The exhaust gas is further directed through the reactors and out thereof through flanged reactor outlets 63, 64, said flanged outlets for sealably connecting the reactor outlets to a vehicle exhaust system (not shown). The first and second burner can exhaust outlets are connected directly to second and third reactor inlets 65, 66 and 67, 68 respectively for directing exhaust gas (arrows 65a, 66a) from the first turbine into the first exhaust reactor 61 and from the second turbine into the second exhaust reactor 62.

The turbine inlet ducts are integral with central turbine housing members 11d, 12d, 13d, the forward exhaust outlet ducts are integral with forward turbine housing members 11e, 12e, 13e and the rear exhaust outlet ducts are integral with rear turbine housing members 11f, 12f, 13f in the engine 10 shown, however, these ducts need not necessarily to so constructed and oriented in the event a different orientation of engine components is desired. The turbine rear flanges 18a, 19a, 20a are integral with rear bearing-seal housing portions 69, 70, 71 of rear turbine housing members 11f, 12f, 13f. The forward turbine housing members 11e, 12e, 13e each have a central bearing-seal housing portion 72, 73, 74 having a turbine-to-compressor mounting flange 75, 76, 77 on front ends thereof for mounting to a compressor-to-turbine mounting flange 80, 81, 82 on compressor housing rear members 83, 84, 85. The compressor housing rear member comprises the mounting flange 81, and forward therefrom a forward shaft extension chamber housing 86, 87, 88, a forward turbine shaft bearing housing 78, 79, 79a and forward therefrom an air collector chamber housing 89, 90, 91. Forward of the chamber housing 89, 90, 91 is a compressor housing front member 92, 93, 94 being sealably bolted to the chamber housing 89, 90, 91 by bolt fastening means a, b, c, d, e (see FIG. 30) having a gasket seal means 90a therebetween.

Figure 30:
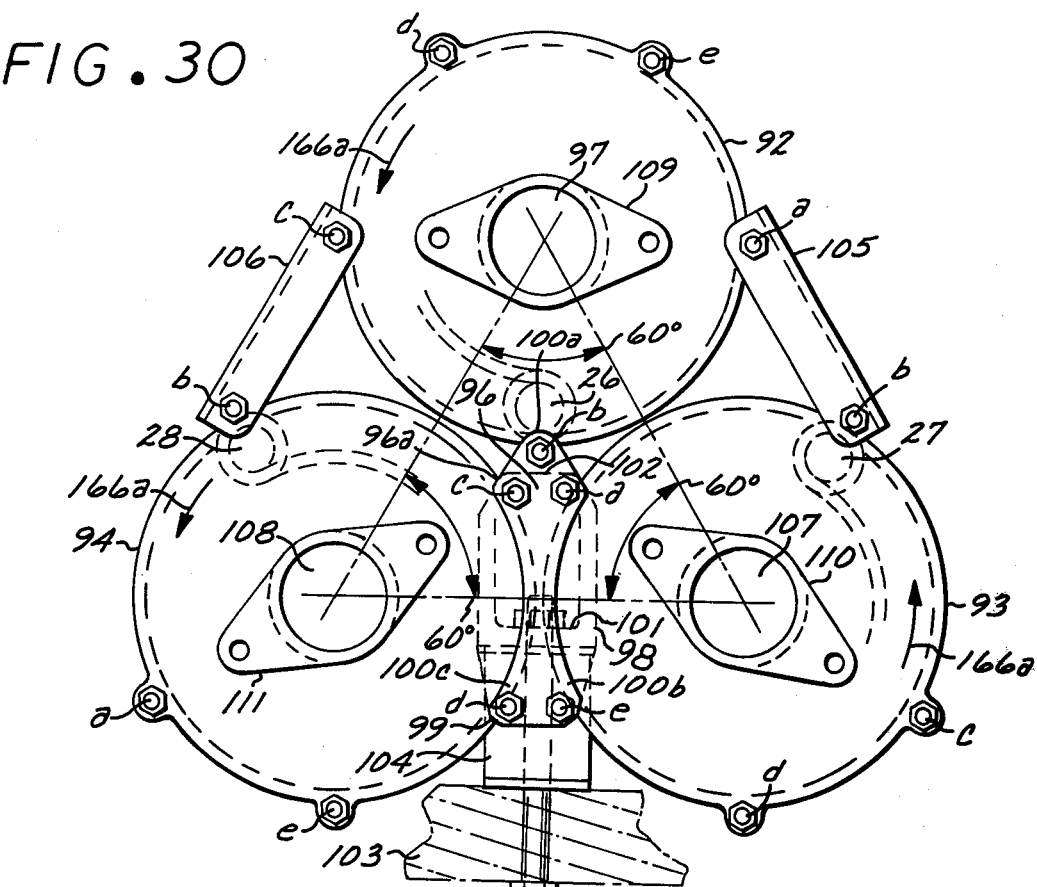
FIG. 30 is a front plan view of the engine in FIGS. 1, 2, and 3 taken along line 30—30 of FIG. 3 and showing a method of mounting a primary compressor atop a first (right) compressor and a second (left) compressor.

Referring to FIG. 30 which is a front plan view of the three mounted compressor assembled housings, as described above, oriented in parallel relationship with the three turbines as previously described, it may be observed that the primary compressor assembly 11b is mounted atop right and left compressor assemblies 12b, 13b and is bolted to a common mounting bar 96 by the primary compressor by bolt fastening means b, thereby orienting the primary compressor outlet duct 26 below a primary compressor inlet duct 97 on a line which is perpendicular to an engine mount bar 98 and which lies on centers of the primary compressor outlet and inlet and is tangent to the first (right) compressor 12b and the second (left) compressor 13b located beneath the primary compressor 11b. The second compressor is bolted to the common mounting bar 96 by first compressor bolt fastening means c at a bar upper end 96a and by bolt fastening means d at a bar lower end 99. The first compressor is bolted to said bar 96 by first compressor bolt fastening means a at said bar upper end and by bolt fastening means e at said bar lower end. The bar 96 is fastened to front members 92, 93, 94 on front surfaces 100a, 100b, 100c thereof. An engine mount member 98 is fastened to the compressor air collector housing members 89, 90, 91 on rear surfaces thereof with a mount member top end 102 being bolted to second compressor bolt fastening means c and first compressor bolt fastening means a. The engine mount member has a right angle portion 101 bolted to an engine shock absorbing means 104 which is mounted on an engine mount bar 103, said bar being transverse to said engine 10. Stabilizing bars 106, 105 are mounted between primary bolt means c and second compressor bolt means b and between primary bolt means a and first compressor bolt means b respectively. Compressor outlet ducts 26, 27, 28 are adjacent compressor bolt fastening means b in each instance. The stabilizing bars are to provide additional rigidity to the mounted engine parts against rotational forces when the engine 10 is operating. Each compressor has an air inlet duct 97, 107, 108 centrally located in the front housing member 92, 93, 94 having inlet flanges 109, 110, 111.

Referring to FIGS. 1, 2, 3, 29, and 30, a primary inlet flange 109 has sealably mounted thereto a start-up air pre-heater 112 (see FIGS. 1, 4, and 29) for heating air flowing into the primary air inlet duct 97 during engine start-up. First and second air inlet flanges 110, 111 have solenoid controlled normally closed open-close air valves 113, 114 (see FIGS. 1, 2, 4, and 19) sealably mounted thereon for closing the first and second air inlet ducts when the first and second power boost turbine assemblies 12, 13 are not in service and opening said air inlet ducts thereby permitting air to flow thereinto as the turbine assemblies 12, 13 are placed in service for providing additional engine power output when required. The pre-heater 112, and the open-close air valves 113, 114 are mounted intermediate said respective air inlet duct flanges 109, 110, 111 and an air cleaner-silencer means 115. The air cleaner-silencer means has a plurality of air intake ducts 115a for admitting air (arrow 115b) thereinto from the atmosphere, said air thereafter flowing into the compressor when the air valves are open through diverging inlet openings 115c, 115d, 115e within the air cleaner-silencer. The air cleaner-silencer shown has a configuration designed to adapt to the engine 10 herein described, but otherwise is of a conventional automotive construction.

Figure 5:
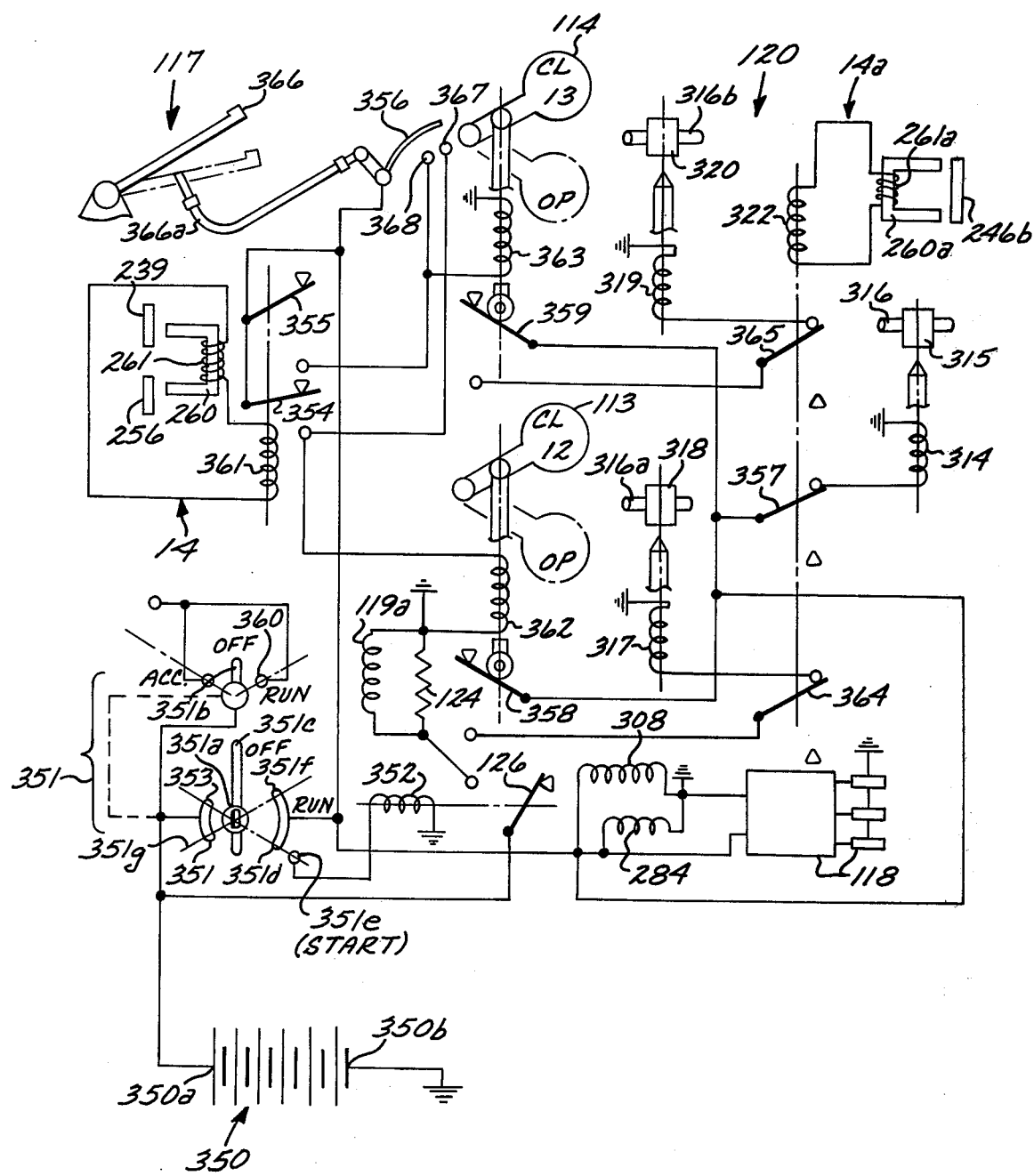
FIG. 5 is an electrical circuit schematic diagram of a step-turbine engine electrical control means for providing control for a step-turbine engine having a primary turbine assembly and two power boost turbine assemblies.

The engine 10 has a fuel delivery system 116 (see FIGS. 2 and 8), an electrical distribution wiring means 117 (see FIGS. 1 and 5), ignition control means 118, a starter means 119a (shown in phantom in FIG. 13), fuel injection plug means 119 (see FIGS. 15 and 25), and an electronic control means 120 (see FIG. 1 and 4 for mechanical orientation and FIG. 5 for electrical description). These components of the engine will be discussed in greater detail later.

Mechanical Details of the Engine

Component parts of the engine 10 will be discussed and described in this section and the part played in the combination will be discussed and described in the section on operation of the engine 10.

The primary assembly air pre-heater 112 has an insulator O-shaped body 121 (see FIG. 29) having a preheater mounting flange means 122 for sealably and mateably mounting the body to the primary compressor inlet duct flange 109 (see FIG. 30). The body 121 has central air passage opening 123 having an electrical heating element 124 insulatingly fixedly mounted therewithin, said element has two or more electrically conductive leads 125 connected thereto passing from the opening through a body wall of said O-shaped body and extending out therefrom for electrically connecting the heater element to a solenoid controlled on-off switch 126 (see FIG. 5). The pre-heater is mounted intermediate said primary compressor flange and the air cleaner, said air cleaner having primary compressor, first compressor, and second compressor air cleaner-silencer outlets 127, 128, 129 (typically shown in the block diagram of FIG. 4) in coaxially alignment with said compressor inlets, said primary compressor inlet being aligned with the heater air passage opening.

The solenoid controlled normally-closed open-close air valves 113, 114 have front and rear housing members 130, 131, 130a, 131a (see FIGS. 19 and 21) defining a valve chamber 132 therebetween and having an air flow through passage 133 extending from front to rear housing members and through said housing members 130, 131, said chamber 132 enclosing therewithin a pivotable plate valve 134 (shown in closed position and in phantom open position in FIG. 21), said plate valve being fixedly attached at a lower end 135 thereof to a plate valve actuator shaft 136, said shaft having pivot means 137 in front and rear housing members pivotable as shown by arrows 137a and having a shaft extended portion 138 having fixedly mounted thereon a gear means 139 (FIG. 21), said gear means meshing with a rack gear 140 (FIG. 20) controlled by a rack gear solenoid control means 141 for pivoting the plate valve away from said air flow through passage against a closing spring 142 when air is required to flow into the first and second compressor inlet ducts 107, 108, said spring for maintaining said valve in a normally closed position. Only one valve is described herein since both first and second compressor valves are identical, there being one valve on each duct as described earlier herein. The plate valve when closed makes an air tight seal against "O" ring seals 143 thereby shutting off air flow into said compressor inlet ducts when the assembly 12, 13 is not providing power for the engine 10.

Figure 9:
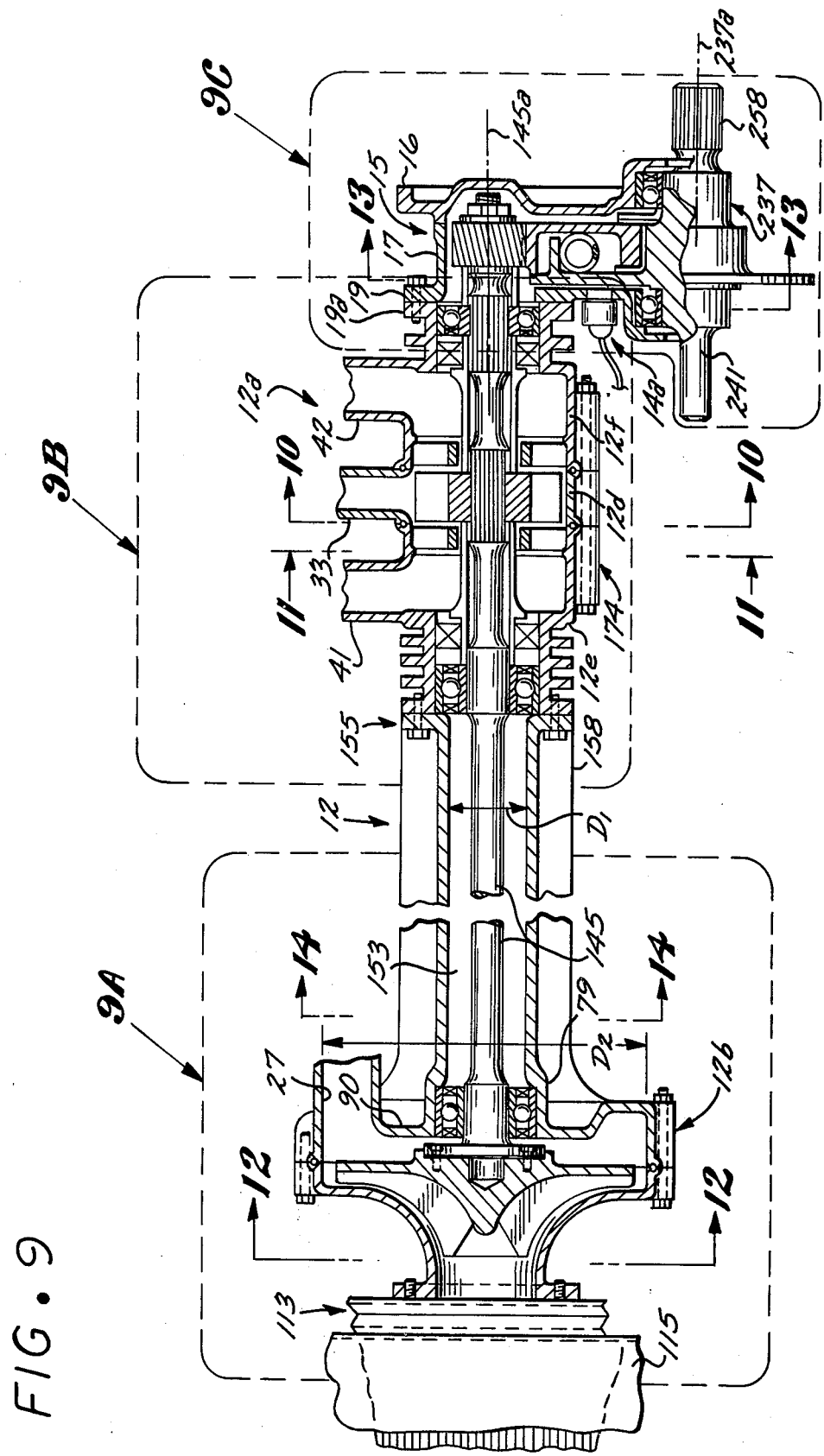
FIG. 9 is a cross-sectional view of a gas turbine assembly of this invention taken along line 9—9 of FIG. 2.
Figure 9A:
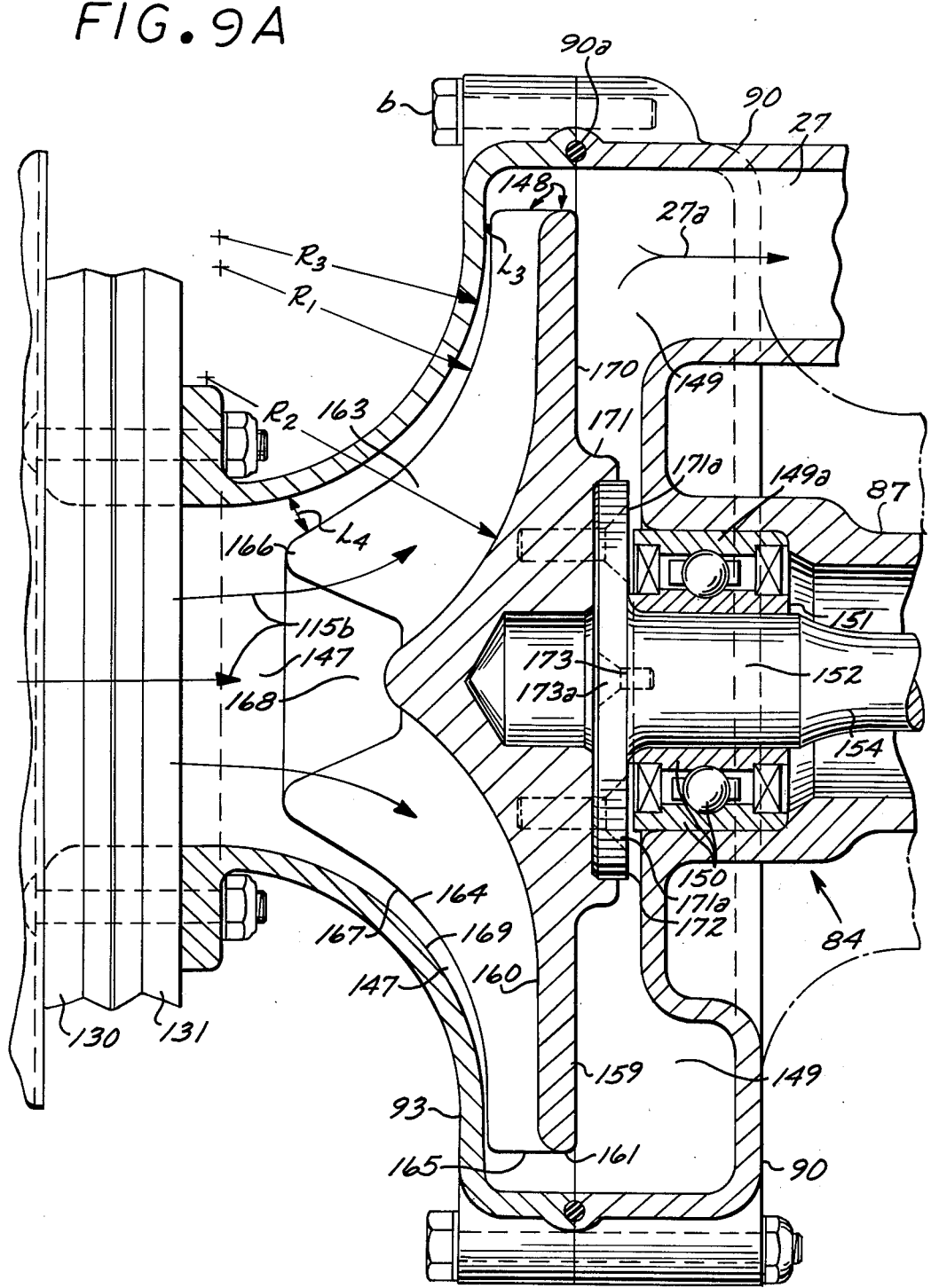
FIG. 9A is the compressor portion of FIG. 9 enlarged for clarification.
Figure 9B:
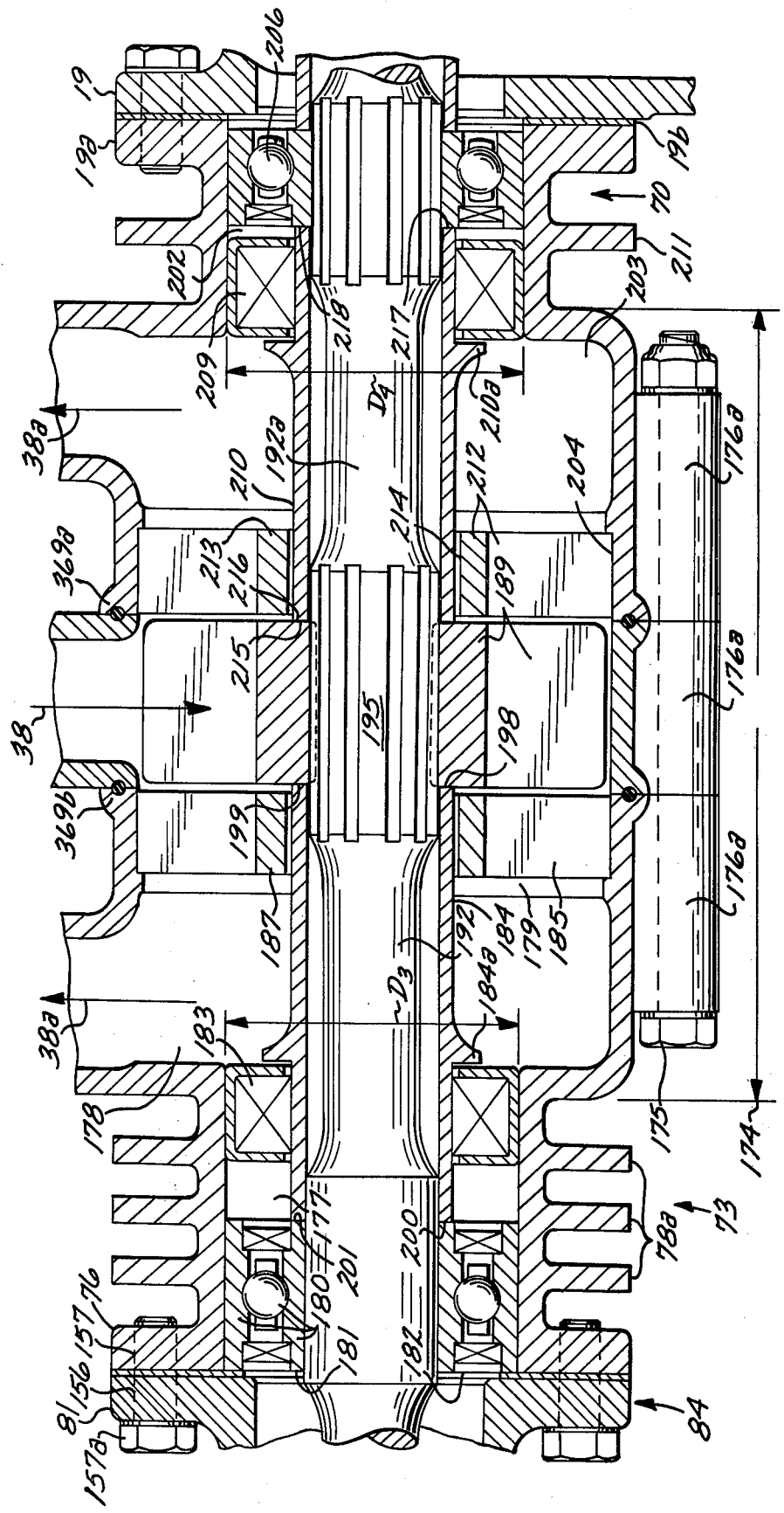
FIG. 9B is the turbine portion of FIG. 9 enlarged for clarification.

Each of the assemblies 11, 12, 13 have turbine units 11a 12a, 13a positioned rearwardly from the compressors 11b, 12b, 13b and rotating parts of each of the compressors and turbine units are affixed to and operate rotatably around common axes 144a, 145a, 146a (depicted in FIG. 9 and identified by numeral 145a) on one piece turbine shafts 144, 145, 146. The details of the engine 10 will be clearer after a discussion of the mechanical features of the first power boost turbine 12a and its associated compressor unit 12b which are representative of each of the assemblies 11, 12, 13. The compressor-turbine units 11a, 12a, 13a are depicted cross-sectionally in FIGS. 9, 9A, 9B, and 9C. Except for radial alignment of turbine gas inlets 32, 33, 34 and turbine exhaust gas outlets 39, 40; 41, 42; 43, 44 and radial alignment of air outlet ducts 26, 27, 28, the compressor and turbine units are constructed identically. The turbine housing members for each of the turbine units are capable of being bolted together to accommodate required radial alignment of the gas inlets and exhaust gas outlets to a desired engine design orientation for assemblies 11, 12, 13. Referring to FIG. 9A, the compressor front housing member 93 defines a compressor forward air induction chamber 147 and serves as a shroud for a compressor rotor 148 within the chamber 147. The compressor housing rear member 84 defines an air collector chamber 149 rearward from the compressor rotor 148 within an air collector chamber housing 90; the air outlet duct 27; a forward turbine shaft bearing chamber 149a having a sealed permanently lubricated bearing 150 therein having an inner bearing cylindrical shell bearing chase 151 encircling a compressor rotor shaft portion 152; an elongate cylindrical extension shaft chamber 153 having axially located therewithin a turbine shaft forward extension portion 154; and the compressor-to-turbine mounting flange 81 on a rearward end 155 of the housing rear member 84 (FIG. 9B). The flange 81 has a plurality of bolt holes 156 therethrough spaced uniformly around said flange and being mateable with corresponding bolt holes 157 in the turbine-to-compressor mounting flange 76 for sealably bolting said flanges together with bolt means 157a. The two flanges are capable of being bolted together to accommodate desired radial alignment of the compressor air duct 27. Referring to FIG. 14, it can be seen that the shaft extension housing 84 has a plurality of elongate reinforcing members 158 extending perpendicularly outwardly therefrom aligned horizontally along said housing from the flange 81 to the air collector chamber housing portion 90 for providing partial cooling for the compressor-turbine unit 12a, 12b. The cylindrical extension shaft chamber 153 has a relatively small diameter $D_1$ (FIGS. 9 and 14) compared with a compressor diameter $D_2$ (FIGS. 9 and 12).

Referring to FIGS. 9A, 12, 32, and 33, the compressor rotor 148 comprises a rotor wheel 159 having a curved front surface 160 curving upwardly from a relatively thin wheel edge 161 to an elevated central portion 162. The rotor wheel 159 has thereon a plurality of thin perpendicular radial air inducer-impeller blades 163 (see FIG. 12) spaced equidistantly around the wheel front surface. The blades have upper blade edges 164 curving upwardly from a relatively short blade heighth $L_1$ (see FIG. 33) at a blade wheel edge portion 164 to a substantially greater blade heighth $L_2$ (see FIG. 32) at a blade central portion 166, said blade central portion being in concentric alignment with wheel central portion 162 and disposed outwardly from a wheel center. The upper blade edges have a blade edge radius of curvature $R_1$ less than a wheel front surface radius of curvature $R_2$. Beginning at the blade central portion 166, a blade air inducer portion 167 tapers downwardly to the wheel central portion, said air inducer portion and central portion 166 being curved-over in a scroll-like manner in a rotor direction of rotation 166a (see arrow 166a in FIG. 12 and see FIG. 32) forming an air scoop. When the rotor rotates, the blade air inducer portion 167 forms a conically shaped rotor air intake section 168 within the compressor air inlet. The blades upper curved edges 164 radius of curvature $R_1$ is greater than an inside curved shroud surface radius of curvature $R_3$ and the shroud inner surface 169 is in close proximity to and is separated from the blade edges 164 at the blade wheel edge portion 165 by a relatively small distance $L_3$ and at the blade central portion 166 by a larger distance $L_4$ to allow air to flow into the intake section through the compressor air inlet duct and thence into the blade air inducer portion 167 and radially outwardly therefrom into the annular air collector chamber 149 and out thereof through the compressor air outlet duct 27 as the compressor rotor 148 rotates when the engine 10 operates. The rotor wheel further has a rear surface 170 having a central rotor mounting portion 171 adapted to be mounted fixedly onto a circular rotor mounting plate 172 by screw means 171a, said mounting plate being fixedly centrally bolted onto a rotor shaft forward end 173 by a rotor plate to shaft mounting scrww 173a to permit rotation of the rotor when the shaft rotates.

Referring to FIGS. 9B, 10, 11, and 17, the mechanical aspects of the turbine unit 12a, which is also representative of the primary and second turbine units 11a, 13a, may be described. The turbine housing 174 is formed by sealably bolting together the rear turbine housing member 12f, the central turbine housing member 12d and the forward turbine housing member 12e with turbine housing bolt means 175 (FIG. 9), one through an upper and one through a lower bolt retaining member 176, 176a on each of the housing member (see FIGS. 10 and 11). A rear high temperature seal ring 369a is located between the central and rear turbine housing members and a front high temperature seal ring 369b is located between the central and front turbine housing members for said sealably mounting said housing members as described. FIG. 9B shows a cross-sectional view of the turbine unit of the first power boost assembly 12. As shown, the turbine housing members are oriented with the exhaust outlets and the gas inlet in the same vertical plane. While the relative positions of the inlet and outlets are not critical, except as to each engine 10 component orientation, these components are shown as oriented in the drawing for the purpose of discussion only.

The turbine-to-compressor flange is stud mounted to the compressor-to-turbine flange as described earlier. The turbine front housing member defines a central cylindrical shaft bearing-seal chamber 177 within the central bearing-seal housing portion 73 thereof, front exhaust collector cylindrical shaped chamber 178, the front exhaust outlet duct 41 therefor and a front fixed vane mounting cylindrical chamber 179 (see FIG. 11). The bearing and seal chamber 177 has a diameter $D_3$ (see FIG. 9B) greater than the turbine shaft extension housing cylindrical chamber diameter $D_1$ (see FIGS. 9B and 14) and encloses therewithin a permanently lubricated sealed central shaft bearing 180 mounted with a central bearing front outer rim surface 181 positioned against a compressor-to-turbine flange inner portion 182, said bearing and seal chamber has rearwardly from the bearing an annular high temperature gas seal 183 encircling a turbine shaft encircling first sleeve 184. The central bearing-seal housing portion 73 has a plurality of annular cooling fins 78a extending outwardly therefrom. The vane mounting chamber has shrink fitted therein a fixed vane as embly 185 (see FIG. 11) having a plurality of scroll shaped vanes 186 (see FIGS. 11 and 17) disposed radially equidistantly about an annular support member 187 (see FIGS. 9B and 11). In the embodiment described herein there are two fixed vanes 186 for each turbine wheel blade 188 of a turbine wheel 189. The vane support member 187 has an inner surface 190 (see FIG. 11) in coaxial spaced apart relationship with the first spacer sleeve 184, said sleeve 184 fixedly encircling a turbine shaft front sleeved portion 192 rotating therewith. As shown, the front sleeve 184 has a forward circular extension 184a adjacent the gas seal 183 for directing exhaust gases 38a away from the seal and out through the exhaust duct.

The turbine central housing member 12d defines a cylindrical turbine wheel chamber 193 (FIG. 10) encircling the turbine wheel 189 and further defines the gas inlet duct 33 (see FIG. 9). The turbine wheel comprises a central annular turbine blade support member 194 (see FIG. 10) coaxially spline mounted on a turbine wheel shaft splined portion 195, said splined portion 195 for fixedly holding the turbine wheel 189 in rotational alignment with the shaft. The turbine blade support member has a plurality of said curved turbine blades 188 disposed radially and equidistantly around the central annular support member (see FIGS. 10 and 17). The turbine blades each have a substantially uniform half-moon curvature extending radially outwardly from the support member, said curvature (see FIG. 17 numeral 188) being at right angles to said radially extended blade 188. The turbine wheel is a modified Pelton wheel or impulse type turbine wheel. The first sleeve 184 abuts against a turbine wheel support member front surface 198 on a sleeve rearward end 199 and abuts against a central bearing inner race rear surface 200 on a forward sleeve end 201 thereof and fixedly encircles the turbine shaft therebetween.

The turbine rear housing member 12f has on the rear bearing-seal housing portion 70 thereof the turbine mounting flange 19a bolted to the right rear mounting flange 19 of the front gear reduction housing member, as described earlier, and have therebetween a rear gasket seal 19b. The turbine rear housing member 12f defines a rear cylindrical shaft bearing and seal chamber 202 within the rear bearing-seal housing portion 70, a rear exhaust collector cylindrical chamber 203 forwardly from the bearing and seal chamber, the rear exhaust duct 42 for the rear exhaust chamber and a rear fixed vane mounting cylindrical chamber 204. The rear bearing and seal chamber has a diameter $D_4$ greater than a pinion gear chamber diameter $D_5$ of a pinion gear chamber 205 (see FIG. 9C) in the reduction gear assembly 15 and encloses therewithin a rear shaft bearing 206 mounted with a rear bearing outer chase 207 positioned intermediate a rear mounting flange inner portion 208 of the front gear reduction housing member 17 and a rear annular high temperature gas seal 209 mounted forwardly from the rear bearing 206 within the bearing seal chamber 202, said gas seal 209 is coaxial with a shaft encircling second spacer sleeve 210. The rear bearing 206 is mounted slip fittingly within said bearing chamber 202 and is free to slip forward and aft therewithin to allow for forward and aft expansion and contraction respectively of the case with respect to the turbine assembly. The rear bearing-seal housing portion of the rear housing member has one or more annular cooling fins 211 extending outwardly therefrom. The rear vane mounting chamber has shrink fitted therein a rear fixed vane assembly 212 being a mirror image orientation of the forward fixed vane assembly and otherwise constructed identically thereto. A rear vane support member 213 has an inner surface 214 which is in coaxial spaced apart relationship with the second sleeve 210. The second sleeve abuts against a rear turbine wheel support surface 215 on a second sleeve front surface 216 and against a rear bearing inner bearing race front surface 217 on a second sleeve rear surface 218 said second sleeve fixedly encircles a turbine shaft rear sleeved portion 192a therebetween. As shown, the second spacer 210 has a rear circular extension 210a for directing exhaust gases away from the gas seal.

Figure 9C:
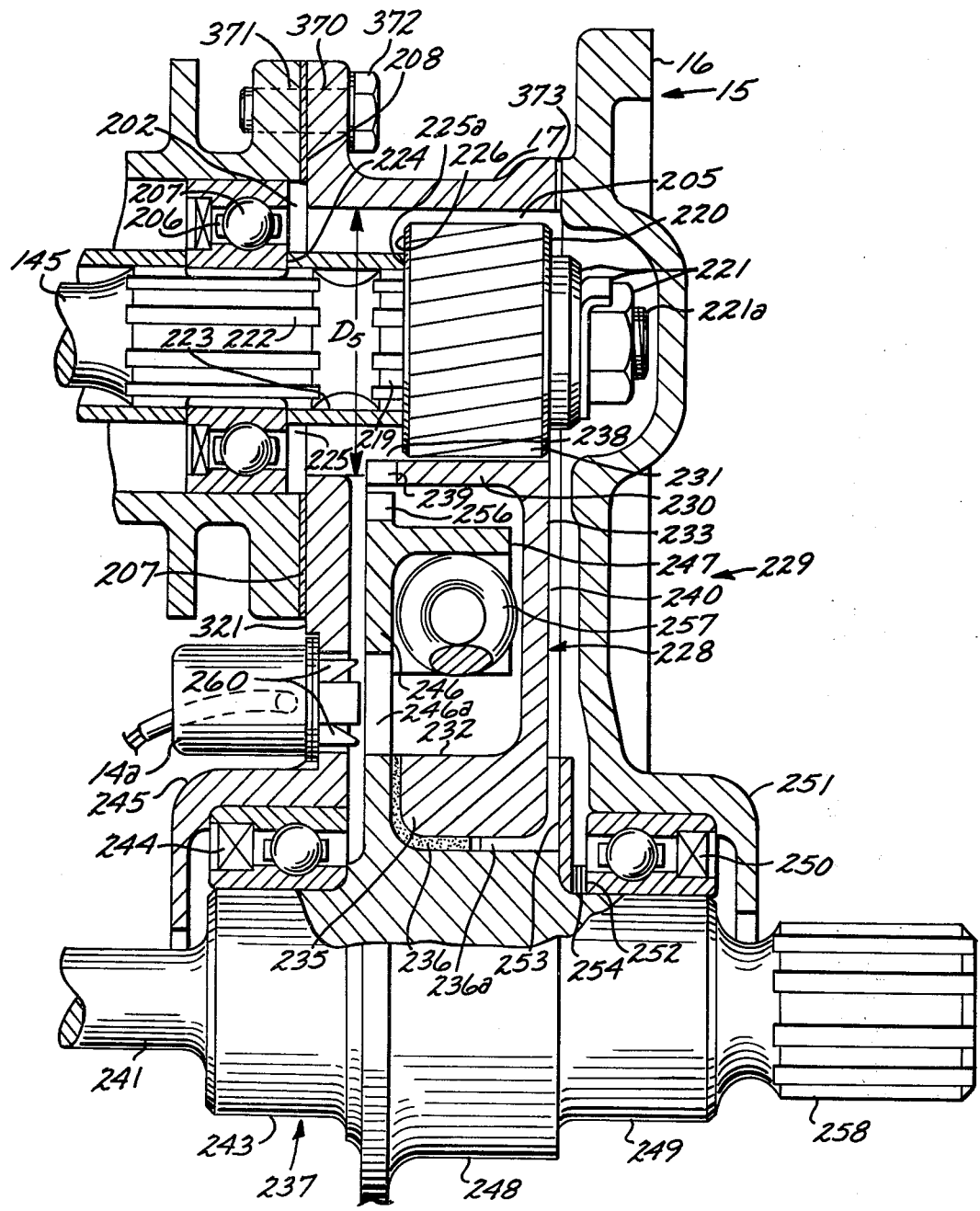
FIG. 9C is the gear reduction assembly portion of FIG. 9 enlarged for clarification.

Referring to FIG. 9C, the turbine shaft 145 has mounted on a rear turbine shaft extension splined portion 219 a turbine drive pinion gear 220, said splined portion being mateable with a turbine wheel splined portion and with a turbine rear bearing and seal chamber shaft splined portion 222. A third spacer sleeve 223 abuts against a rear bearing inner race rear surface 224 on a third sleeve front surface 225 and against a pinion gear front surface 226 on a third sleeve rear surface 225a. The third sleeve fixedly encircles the shaft intermediate the pinion gear front surface 226 and the rear bearing inner race rear surface 224. The pinion gear is fixedly mounted on the splined shaft portion 219 by a gear retaining nut and washer means 221 screwed onto a shaft threaded portion 221a such that a forward thrust is exerted via the pinion gear on the third, second, and first spacer sleeves and against the surfaces against which the spacers abut for maintaining positions of the turbine rotating parts in proper orientation and alignment within the turbine housing and further providing gas seals therewithin along the turbine shaft.

The fixed vane assembly scroll shaped vanes are positioned adjacent the turbine wheel in non-touching position having curved scroll shaped surfaces curved in opposite direction to the curve of the wheel blades. The front and rear vanes are aligned horizontally along the shaft axis and align with the wheel blades as the wheel rotates and the blades thereby rotate passing the fixed vanes. The fixed vanes provide additional rotational thrust to the wheel blade as the high velocity gas passes though apertures 227 intermediate the vanes.

As described earlier, there are three positions for mounting turbine assemblies on the front gear reduction housing member for the embodiment described herein being representative of a step-turbine engine having one or more primary turbine assemblies and one or more power boost turbine assemblies. In the event more than three turbine assemblies are required, more positions could be made available on the front gear reduction housing member and on the air cleaner-silencer means 115 with appropriate dimensional adjustments for mounting turbine units therebetween and such a configuration of the engine would still be within the scope of the invention described herein.

Figure 31:
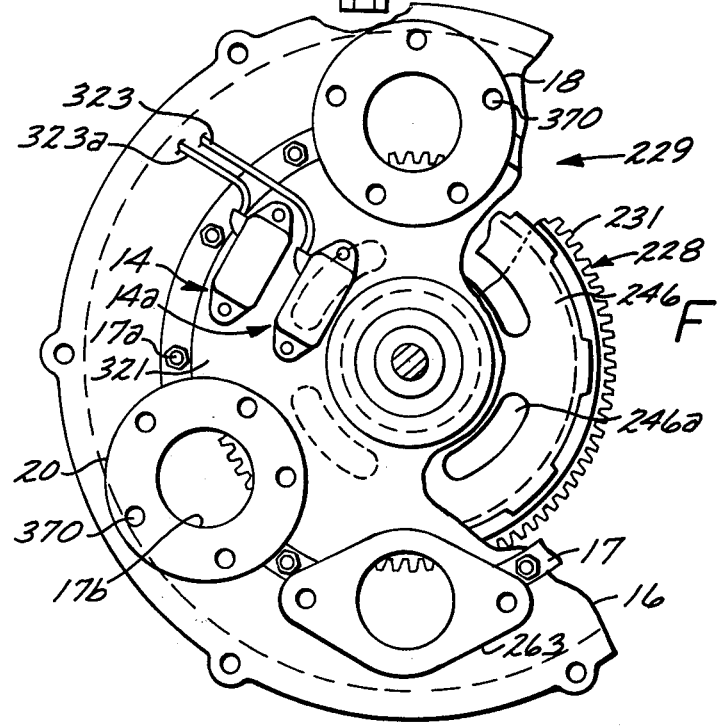
FIG. 31 is a front plan view of a reduction gear housing of the invention with the three turbine assemblies removed therefrom and fragmented to show torque sensor actuating means and over-speed control actuating means taken along line 31—31 of FIG. 3.

Referring to FIGS. 9C, 13 and 31 the mechanical features of the reduction gear assembly may be described. It will be observed that the gear reduction assembly serves not only as a power output drive means for the engine 10, but also incorporates the mechanical features of the power output demand sensor 14 and the turbine overspeed control 14a. Power is delivered from the turbine units of turbine assemblies 11, 12, 13 each being represented by the described firstpower boost turbine via the pinion gear 220 mounted on the rear turbine shaft splined portion 219 to a drive gear 228 portion of a main reduction gear drive assembly 229 mounted within the assembled reduction gear housing. The pinion gear meshes with a drive gear forwardly extending peripheral gear ring portion 230 having drive gear teeth 231 thereon disposed uniformly around the outside thereof.

The main reduction gear drive assembly is rotatably mounted within the assembled reduction gear housing comprising the rear housing plate 16 and the front reduction gear housing member 17. The assembled housing 16, 17 also serves as an oil sump for lubricating the rotating parts of the main reduction gear drive, and the rear turbine shaft bearing. The main reduction gear drive assembly comprises the drive gear 228 and the power output drive shaft assembly 237 torsionally coupled by torque sensor load springs 257 co-operably mounted therebetween. The drive gear 228 comprises the forwardly extending integral peripheral gear ring portion 230, a forwardly extending integral annular central shaft mounting portion 232 having intermediate therebetween a drive gear thin plate portion 233. The thin plate portion has two forwardly extending torque sensor load spring rear holding blocks 234 (see FIG. 13) fixedly mounted thereon and spaced diametrically apart on said thin plate portion 233. The annular central shaft mounting portion defines centrally thereof a power output shaft opening 235 encircling a shaft slide bearing 236, 236a, said slide bearing having a front slide bearing portion 236 and a rear slide bearing portion 236a, said two portions for permitting mounting of the slide bearing, said slide bearing for permitting the drive gear 228 to rotate freely about a slide bearing mount portion 248 of the drive shaft assembly 237 encircled by said slide bearing 236 intermediate the opening 235 and a bearing mount portion 248. The gear ring portion has on a front surface 238 thereof a plurality of rear torque sensor armature plates 239 disposed incrementally uniformly around said ring front surface. The drive gear has a substantially flat rear surface 240. The drive shaft assembly 237 comprises a one piece unit bearingly mounted within the assembled housing 16, 17, having a front cylindrical auxilliary drive shaft 241 extending forwardly from the front housing member 17 and having an auxiliary drive pulley 242 mounted thereon (see FIG. 1) and rearward from said auxiliary drive shaft 241 a front bearing mounting portion 243 encircled by a front drive shaft sealed bearing 244 enclosed within a front housing bearing retaining enclosure 245 and rearward the bearing mounting portion an annular drive gear coupling plate 246 having integral therewith a peripheral rearward extension 247 dimensioned to mate in non-touching position with the gear ring portion 230 of the drive gear 228 and being disposed concentrically inwardly therefrom and in non-touching position with respect to the plate thin portion thereof, and rearward the drive gear coupling plate 246 the slide bearing mount portion 248 encircled by the slide bearing 236, and rearward therefrom a power output drive shaft bearing mounting cylindrical shaft portion 249 encircled within a rear drive shaft sealed bearing 250 enclosed within a rear bearing retaining enclosure 251 centrally located within the rear housing plate 16. Intermediate a rear bearing inner retainer 252 and a slide bearing rear retainer 253 is a drive gear positioning washer 254 for maintaining the drive gear and the slide bearing in nesting position. Intermediate the drive gear coupling plate rearward extensior 247 and the slide bearing mount portion 248 are mounted two rearward extending torque sensor load spring front holding blocks 255 being concentrically aligned with the drive gear forwardly extending blocks 234 and spaced on the gear coupling plate diametrically apart and disposed 90° circumferentially from the drive gear forwardly extending blocks 234. The drive gear coupling plate has extending outwardly from a coupling plate periphery 256a a plurality of front torque sensor armature plates 256 disposed incrementally uniformly around said periphery 256a being mateable in non-touching close proximity with the rear armature plates 239 on the gear ring when aligned therewith. The rear holding blocks 234 and the front holding blocks 255 are torsionally biased against each other by torque sensor load springs 257 thereby allowing a power transfer from the drive gear to the drive gear coupling plate and thence to a rearward extending load coupling member portion 258 of the drive shaft assembly 237. The drive shaft assembly rotates about a drive shaft axis 237a when the engine operates.

Figure 6:
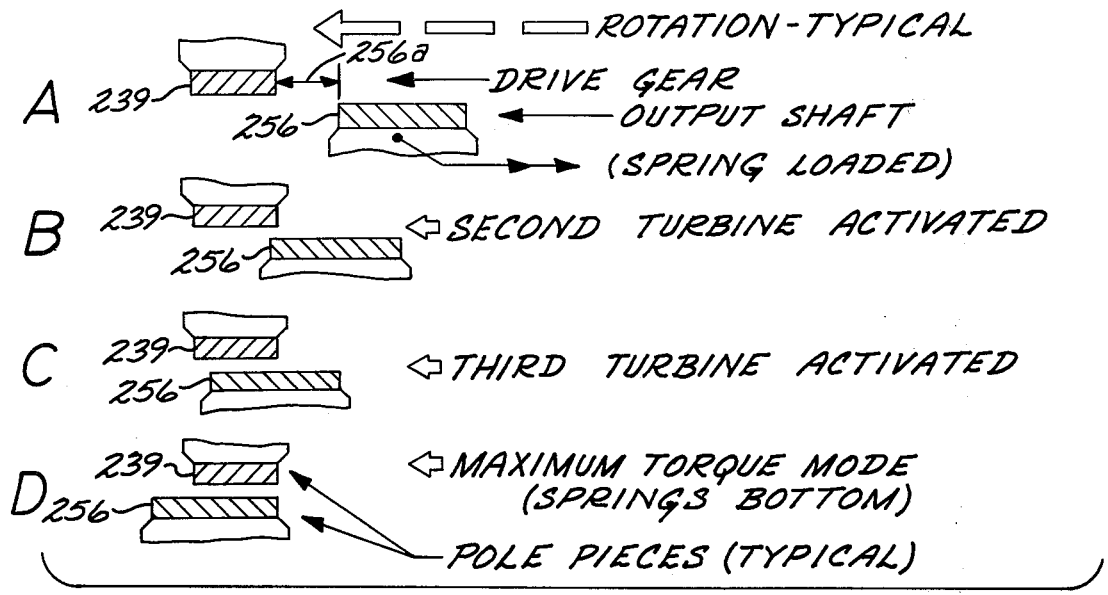
FIG. 6 is a fragmented cross-sectional view of a front and rear armature plate set for activating and de-activating a first and a second power boost turbine assembly of a three turbine engine.
Figure 7:
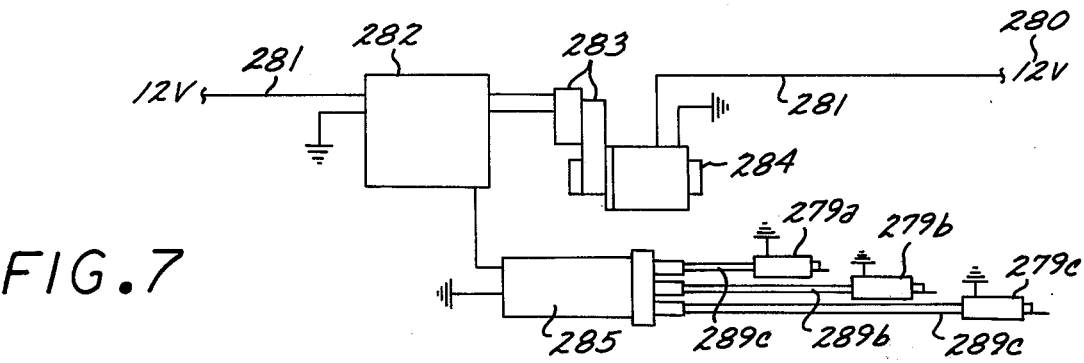
FIG. 7 is a block diagram of an electrical system for producing a continual ignition of an air-fuel mixture in a burner can assembly of the invention of a three turbine engine embodiment by using a modified conventional spark plug for igniting the mixture within the can assembly.

Referring to FIG. 6, when a load is applied to the output drive shaft which is within the capability of the primary turbine assembly, the rear and front armature plates 239, 256 are relatively widely separated as in FIG. 6-A. As the load increases resulting in a torque being applied to the shaft, the torque sensor load springs are compressed in proportion to the amount of torque produced by the load thereby bringing the rear armature plate 239 and the front armature plate 256 into closer proximity 259 as shown in FIG. 6-B,C,D. As the armature plates move into closer proximity, an increased magnetic permeability is presented to a U-shaped permanent magnet 260 between north and south pole pieces 260a, 260b thereof, said magnet being a portion of the torque sensor means 14 (see FIGS. 22 and 23), as the paired plates 239, 256 rotate past the pole pieces. This produces a change in current generated in a sensor coil 261, said coil encircling the space between the pole pieces and the closed end of the U-shaped magnet, said change in current is proportional to the torque load produced by the load on the power output drive shaft coupling member. This is translated into an electrical sensor signal which is conducted to the electrical control means which then activates the power boost turbine assemblies in sequence as the torque is increased. The electrical control means will be discussed more fully in conjunction with the engine operation discussion.

Referring to FIGS. 13 and 31, a provision is made for a starter motor means 119 (shown in phantom lines in FIG. 13) to be mounted on a lower portion 263 of the reduction gear front housing, said starter having a starter pinion gear 264 meshing with the gear ring and having a rear flange boltably mounted onto said front housing member. The starter may be any conventional starter motor having sufficiently high R.P.M and power to rotate the gear ring and turbine shafts at a sufficient rotational velocity to start the engine.

Referring to FIGS. 15, 15A, and 16, various aspects of the burner can assembly 12c are depicted. While any conventional turbine combustion chamber adapted to utilize compressed air and mix the air with a combustible liquid fuel in the chamber and thereafter ignite the fuel-air mixture and direct the hot-high velocity gas out of the chamber against a turbine wheel could be used for the engine herein described, the burner can assembly 12c herein described is novel and is particularly well adapted for use with the engine of the embodiment described herein. The burner can assembly 12c comprises an elongate circular tubular jacket 265 encircling a combustor liner 266, said liner being in concentric spaced apart relationship to the jacket 265 and internal thereto, said jacket having the front air inlet 24 adapted to be sealably inserted into the compressor air outlet duct 27, as described earlier, and having opposite thereto the high velocity heated gas outlet duct 30. A plurality of elongate narrow radial heat transfer ribs 267 is provided intermediate the combustor liner 266 and the jacket 265 for maintaining relative concentricity between the liner and jacket and to provide a liner heat sink. The ribs may be attached either to the jacket or the liner (as shown in the drawing, they are integral with the jacket). A fuel injector plug means 268 is sealably inserted through a jacket and liner injection plug opening 268a into an air-fuel-mixing-combustion chamber 269 located forwardly in the liner and rearwardly from the air inlet 24. There is also an air-fuel mixture ignitor plug means 270 similarly inserted into said chamber 269 through a jacket and liner igniter plug opening 270a in the same circular plane as the injector plug and separated angularly in said circular plane from the injector plug means for igniting the fuel-air mixture in said chamber 269. The liner is provided with an air inlet shield means 271 rearwardly from and coaxially with the burner can air inlet 24, said shield means having a plurality of small air inlet holes 271a therein for admitting a portion of the air into the chamber 269 forward of the fuel injector and igniter plugs. The chamber 269 has an internal diffuser 272 rearward from the fuel injector and igniter plugs having a diameter less than a liner diameter and equal to or greater than the diameter of the air inlet 24. The liner has a plurality of holes 273 (see FIGS. 15 and 15A) rearwardly from the chamber 269, said holes having outwardly bent rear edges 274 and inwardly bent forward edges 275. Rearwardly from the combustion chamber 269 is a hot gas expansion chamber portion 276 and rearwardly therefrom is a necked down venturi chamber portion 277 and rearwardly therefrom and being further necked down is the outlet duct 30. As described earlier, the power boost assembly burner cans have heat exchange heaters encircling the burner can for maintaining the power boost burner cans at stand-by temperatures when the primary turbine assembly is operating. The heater 21 comprises a rectangularly shaped annular tube 278 having exhaust inlet and outlet ducts and encircling the heater can expansion housing portion 53 as described earlier.

Compressed air flows into the burner can through the can inlet 24 and a primary portion (primary air) thereof flows into the chamber 269 through inlets 271 where it mixes with the fuel injected thereinto through the fuel injector plug 268 and the resulting mixture is ignited by the igniter plug 270. The other air portion (dilution air) flows laminarly through the space between the jacket and the liner and into the liner through the plurality of holes therein. The ignited air-fuel mixture expands into the expansion chamber and then flows through the venturi chamber portion further drawing compressed air into the chamber through the holes in the liner to aid in completion of said air-fuel mixture combustion and then out through the outlet duct, thereafter being directed as earlier described into the turbine wheel chamber as a high velocity gas to impinge upon the turbine blades and turn the wheel.

Referring to FIGS. 7, 24, 26, 27, and 28 depicting various ignitor means 270 and ignition control means 280 an igniter and ignition system for the engine 10 will be described.

One embodiment of the igniter means 270 comprises a modified standard spark plug 279 (FIG. 24) wherein a central hot spark lead 279a has an extended portion 279b extending outwardly from a spark plug base 279c and into the chamber 269 central portion when mounted as described earlier, said hot spark lead being adjacent to but not touching a ground spark plug terminal 279d, said spark lead being insulated from the terminal 279d by a high temperature electrical insulator means 279e. The extended portion 279b provides a heat retainer and diffuser for maintaining constant fuel combustion within the chamber 269 when fuel is injected thereinto. Electrical energy is provided for sparking the igniter 279 at a rate of about six sparks a second by an ignition control system 280 embodiment of the ignition control means 118 (see FIGS. 5, 7, and 27) powered by an electrical energy supply means 281 a conventional alternator depicted in FIGS. 2 and 3 and an automotive battery—not shown. The ignition control means 280 comprises a conventional reluctor controlled capacitor discharge amplifier unit 282 having a control reluctor 283 driven at a constant speed by a constant speed electric reluctor drive motor 284. The capacitive discharge unit drives an ignition coil 285 (FIG. 7 and 27), said coil having a common iron core 286a, a common 12 volt primary winding 286 and three step-up secondary windings 287a, 287b, 287c, each of said secondary windings having common ground leads 288 and three separate spark plug high voltage leads 289a, 289b, 289c, each of said leads being connected to spark plug igniters 279a, 279b, 279c as described, one for the primary burner can 11c, one for the first burner can 12c, and one for the second burner can 13c. All spark plugs are energized when the primary turbine assembly is energized and all spark at the same constant rate determined by the reluctor drive motor.

Figure 25:
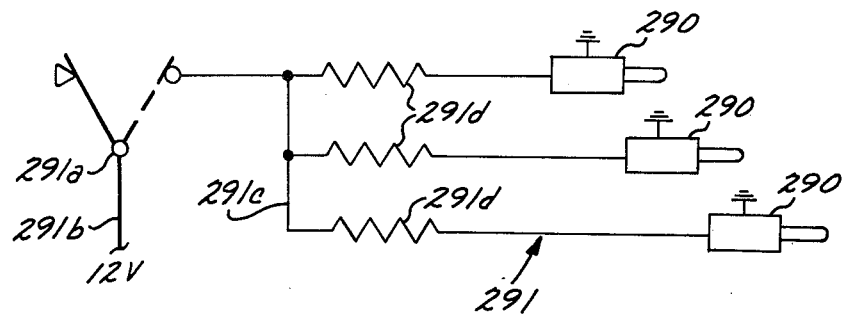
FIG. 25 is an alternate ignition control means for use with a glow plug system for ignition of the air-fuel mixture in the burner can shown in FIG. 15.
Figure 26:
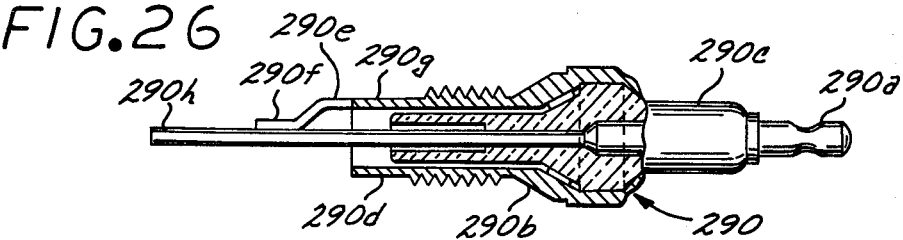
FIG. 26 is a cross-sectional view of a glow plug igniter as an alternate air-fuel mixture igniter means for use in the burner can shown in FIG. 15.
Figure 27:
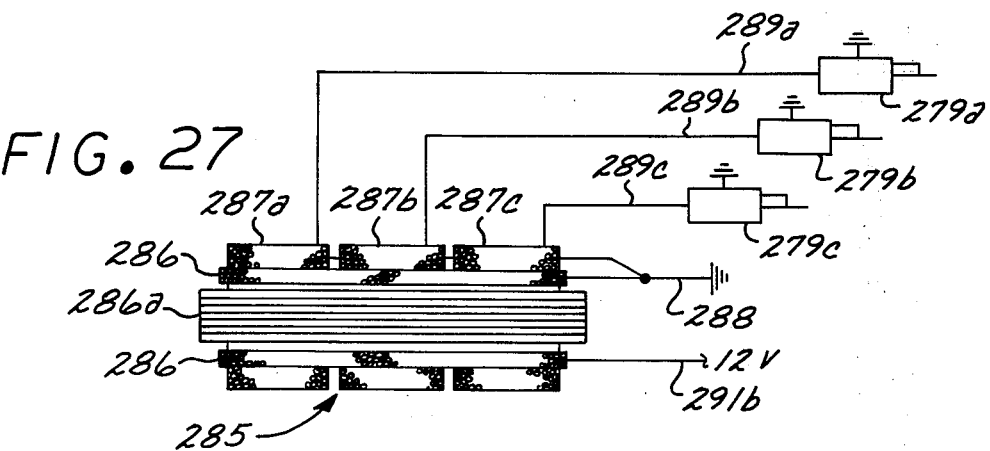
FIG. 27 is a cross-sectional view of an ignition coil means for use with the continuous spark plug air-fuel igniter also showing in block diagram form electrical connections to and from said coil.

Another embodiment of the igniter means 270 and the ignition control means 118 is depicted in FIGS. 26 and 25 showing a glow plug type igniter 290 and a resistor network control system 291.

The igniter 290 is a modification of a standard glow plug having a central electrically hot lead 290a insulated from a plug case 290b by a high temperature insulator 290c, said hot lead extending outwardly from a case base 290d and being fixedly connected to a resistive ground lead 290e at a connection position 290f, said ground lead being fixedly attached to said base 290d at an opposite ground lead end 290g and providing a resistive heater element thereby when current flows therethrough. The hot lead 290a has an extended portion 290h extending beyond a hot lead-to-ground lead attachment 290f and into the chamber 269 central portion when the plug is mounted in the burner can as described earlier thereby providing a heat diffusing means therein.

The glow plug ignition system 291 comprises an on-off switch 291a in series with an electrically hot power source lead 291b and a parallel electrical network 291c comprising three legs thereof each leg having a resistor 291d in series with the glow plug igniter 290, there being one glow plug for each of the engine burner cans. All three glow plugs remain energized when the switch 291a is placed in the on position when the engine is turned on and remain energized while the engine is running.

Figure 8:
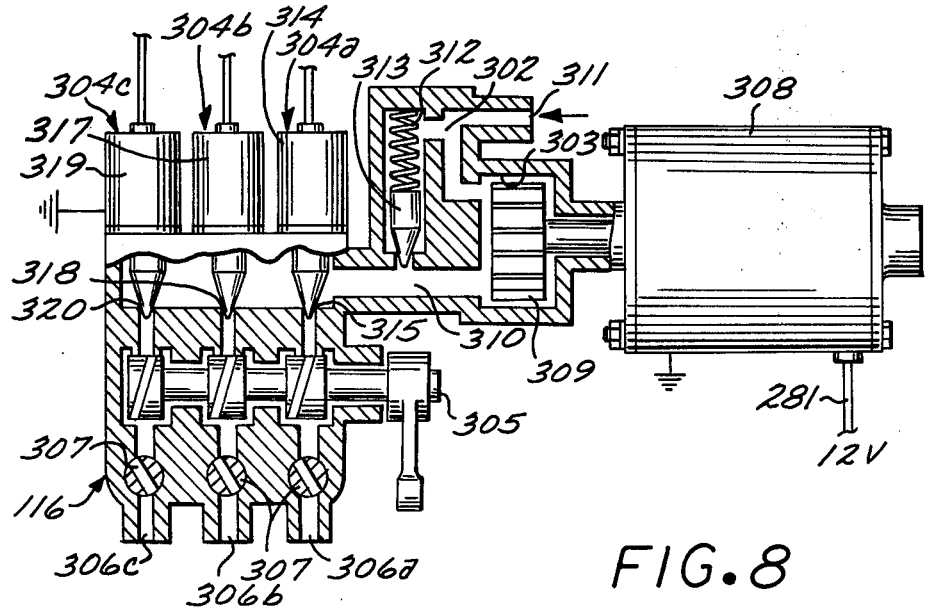
FIG. 8 is a cross-sectional view of a fuel delivery unit for a three turbine engine embodiment of the present invention.
Figure 28:
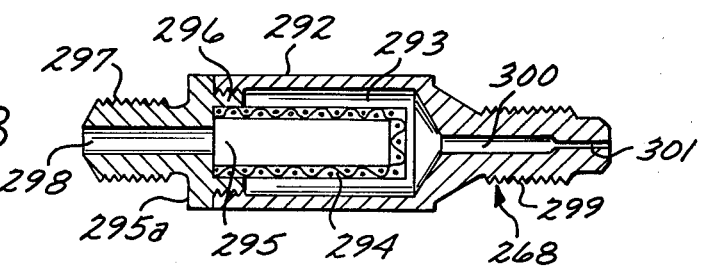
FIG. 28 is a cross-sectional view of a fuel injector plug for injecting fuel into the burner can of FIG. 15.

Referring to FIGS. 28 and 8, the fuel injector plug 268 and a fuel delivery system 116 are depicted.

The fuel injector plug 268 comprises a housing having a barrel section 292 and a filter retaining section 295a, said barrel section defining therewithin a fluid flow-filter containing chamber 293, said filter retaining section having a filter retaining enclosure 296 within said chamber for sealably and detachably mounting a forward filter end 295 of a fluid filter 294 thereinto and having a continuous inlet passage 298 through a fluid inlet line coupling portion 297 of said filter retaining section, said inlet passage opening into said chamber 293 at said forward filter end 295 within said filter retaining enclosure 296, said barrel section having a continuous outlet passage 300 through a burner can coupling portion 299 opposite said inlet coupling portion 297 for sealably and detachably mounting said plug in said burner can injector plug opening 268a, as described, said burner can coupling 299 having a fluid outlet passage 300 therethrough commuicating between said fluid flow chamber 293 and the burner can combustion chamber portion 269 when said plug 268 is mounted in said combustion chamber portion, said outlet passage 300 terminating in a fluid nozzle 301 for reducing fluid flow therethrough to a fine stream or mist for fluid fuel flowing into said combustion chamber portion.

The fuel delivery system 116 (see FIG. 8) comprises in combination a fluid flow manifold 302, an electric motor driven rotary fuel pump 303 integral with said manifold in this embodiment, although it could be separate therefrom, solenoid controlled fluid fuel flow on-off valves 304a, 304b, 304c (one valve for each turbine assembly 11, 12, 13), a common throttle valve 305, controlling flow in each fuel outlet 306a, 306b, 306c simultaneously and fuel outlet idler adjustment means 307. The fuel delivery system will be more clearly understood by describing how it operates. When the engine 10 is energized, a fuel pump motor 308 is energized thereby rotating the pump rotor 309 where upon fuel is pumped into a fuel reservoir 310 communicating with the manifold 302 through a manifold fuel inlet 311 from a fuel supply system (conventional and not shown). The pump has sufficient pumping capacity to provide sufficient fuel to satisfy engine operation under maximum designed load conditions and until the full load is required, a spring loaded needle by-pass valve 312 opens by pressure exerted upon a needle portion 313 thereof by the fuel in the reservoir, said needle remaining open until the pressure drops to a value at which the valve needle spring force is greater than that resulting from the fluid pressure. When the primary turbine assembly is energized, a primary solenoid 314 is energized and a primary fuel control spring loaded fuel valve 315 opens and fuel flows through a primary fuel outlet 306a into the primary burner can via primary fuel line 316 (see FIG. 2) and thence through the primary fuel injector plug. When the sensor means 14 demands additional power output, a first fuel control solenoid 317 is energized thereby opening a first spring loaded fuel valve 318 permitting fuel to flow into the first burner can via a first fuel line 316a and the first injector plug 268. When still more additional power is demanded by the sensor 14, a second fuel control solenoid 319 is energized and a second spring loaded fuel valve 320 is thereby opened permitting fuel to flow into the second burner can through a second fuel line 316b and the second fuel injector plug.

Referring to FIGS. 9, 13, and 31, the mechanical features of the over-speed control 14a may be described. The magnetic pick-up assembly depicted in FIGS. 22 and 23 used to describe the power demand sensor means 14 is identical to the over-speed control magnetic pick-up as shown and described in this embodiment and therefore the same component parts and identifying numerals will be used in describing the over-speed control 14a. The over-speed control 14a comprises a magnetic pick-up magnet member 260 having north and south pole pieces 260a, 260b, said magnet member being U-shaped and having mounted therearound an emf conversion coil 261, said coil enclosing the opening of the U-shaped magnet and encircling said opening and the closed end between the two north-south pole members. The said magnetic pick-up is mounted on the front gear reduction housing front surface 321 positioned thereon to align the pole pieces with over-speed control activation slots 246a and activation webs 246b therebetween, said slots being disposed uniformly around said plate 246 on a circle having said webs intermediate each of said slots on said plate. Each web has a uniform width 246c (arrows) separating adjacent slots for developing changes in the magnetic field of the pole pieces 260a, 260b as the plate 246 rotates and the webs and slots move past the pole pieces in succession. This creates a variable magnetic field between the pole pieces and thereby develops an electromotive force (e.m.f.) in the coil 261 which is proportional to the speed of the rotating drive gear coupling plate 246 causing current to flow through the loop consisting of the said pick-coil 260 and an overspeed control solenoid coil 322 in the electronic control means 120 via conductor leads 323. When the rotational velocity of the drive gear coupling plate 246 exceeds a designed critical value for the engine, the over-speed control solenoid opens three normally closed fuel control solenoid de-activating switches 357, 364, 365 (primary switch 357, first power boost switch 364 and second power boost switch 365) thereby de-energizing the primary, first, and second fuel control solenoids 314, 317, 319 and closing the primary, first and second fuel control valves 315, 138, 320 thereby shutting down the burner cans and therefore engine power. This condition prevails until the turbine speed resumes the correct designed operating rotational velocity and then the three switches 357, 364–365 are returned to their closed position, the over-speed sensor emf having returned to the value produced by the normally running engine.

ENGINE OPERATION

Referring to FIG. 5, which is an electrical circuit schematic diagram for the three turbine assembly engine 10 electronic control means 120, the engine operation will be described. The electrical power source 350 for the engine is a conventional automotive alternator-battery combination (usually twelve volts D.C.) as shown herein, said power source has a positive high (12 volts) voltage terminal 350a and a negative (ground) terminal 350b. Any suitable power supply could be provided and still be within the scope of the invention herein.

The engine 10 is started with a manually operated (usually key operated) starter switch 351 (shown in an "off" position in FIG. 5) having an ignition section 351 and an accessory section 351b co-operably connected so that both sections switch together when the switch is turned on. The engine is started by placing an ignition switch contact arm 351c in a start position 351d thereby supplying voltage to a start contact 351e and energizing a starter solenoid 352 and also supplying voltage to a run contact 351f. The energized starter solenoid 352 closes the motor on-off switch 126 energizing the starter motor 119a and the primary turbine assembly air pre-heater electrical heating element 124. The run contact also supplies voltage to the fuel pump motor 308, the reluctor drive motor 284, the ignition control means 118 via the ignition switch contact arm 351c from a high (12 volts) voltage switch contact 353 and further supplies voltage to the solenoid switching contact arms of the following solenoid operated switches: a first power boost turbine assembly torque sensor actuated switch 354 (normally open), a second power boost solenoid operated turbine assembly torque sensor actuated switch 355 (normally open), a manually operated accelerator pedal power over-ride switch 356 (normally open), a primary turbine assembly fuel control solenoid deactuating switch 357 (normally closed), a first fuel control solenoid actuating switch 358 (normally open) and a second fuel control solenoid actuating switch 359 (normally open).

With the ignition switch in the start position, the starter means 119 pinion gear 264 engages with and rotates the drive gear 228 which rotates the primary turbine-compressor assembly 11a, 11b and the power output drive shaft assembly 237. Air is drawn into the compressor 11b through the air-cleaner-silencer and thence through the start-up air pre-heater and heated compressed high velocity air is directed from the compressor 11b into the primary burner can 11c through the air inlet 23. The primary fuel control solenoid 314 is energized and with the throttle valve 305 rotated to a start position (as shown in FIG. 8) fuel is pumped therethrough into and through the fuel line 316 and into the burner can 11c through a primary fuel injector plug (not visible in the drawing, but identical to the first injector plug 268 described in connection with the first burner can 12c and located similarly on the primary burner can 11c). The fuel and air are mixed and the air-fuel mixture is ignited therein and the high velocity heated gas (described in conjunction with the first power boost assembly 12) is directed against the primary turbine wheel 189a (not shown but identical with the first power boost turbine wheel 189 described heretofore) causing the turbine wheel to rotate at a designed rotational velocity (generally the engine turbines will be designed for rotational velocities within the range of from 20,000 to 70,000 R.P.M. selecting an optimum range of rotational velocities within this range for economical engine power output). However, any acceptable range of velocities for the design purposes to which the engine is to be adapted will still be within the scope of this invention. The exhaust from the turbine is directed out of the turbine through the fixed vane assemblies and into the first and second burner can pre-heaters and thence out through the first and second exhaust reactors as described earlier.

When the engine 10 is started, the primary turbine wheel attains the operating velocity, the ignition switch contact arm is placed in a run position 351g disengaging the start contact 351e and thereby de-energizing the starter solenoid thereby deenergizing the starter motor 119a and the air pre-heater 124. The accessor section 351b of the ignition switch is also in the run position and thereafter supplies voltage to the accessory run contact 360. The accessory switch provides power to the vehicle lighting circuits and other conventional accessories and these will not be discussed herein since they are standard and conventional on vehicles.

With the primary turbine assembly 11 operating, the engine 10 delivers power to the power output drive shaft 237a portion of the output drive shaft assembly 237. A load is applied to the drive shaft 237a in the form of a conventional vehicle transmission and power transfer train assembly (not shown since these parts of the vehicle are conventional and the load may be in any form which requires a rotational coupling to the engine 10 herein described). Application of the load to the output drive shaft portion 237a produces a torque thereon and this torque changes the relative position of the rear torque sensor armature plates 239 with respect to the front torque sensor armature plates 256, decreasing a separation distance 256a (see FIG. 6) therebetween. The decrease in separation being proportional to the applied torque. As the torque increases with increasing load, the separation distance 256a decreases as shown in FIGS. 6 B, C, and D, moving the armature plates more into alignment position as the torque is increased. When the armature plates 239, 256 are in a first critical position (shown in FIG. 6 B as a typical critical position), the sensor means 14 is actuated and the first power boost turbine assembly 12 is placed in service. When the armature plates 239, 256 move closer together into a second critical position (shown in FIG. 6 C as a typical second critical position) the sensor means 14 is further actuated and the second power boost turbine 13 is placed in service adding to the first and primary turbine assembly power output thus compensating for the additional torque load. Further addition of torque load to the maximum load conditions will cause the armature plates to align as shown in FIG. 6 D this being the load limit of the three turbine assembly engine. If further load maximums are required, additional turbine assemblies and hence a larger engine would be required, still being within the scope of this invention.

The rotating drive gear and gear coupling plate having the armature plates thereon rotates the armature plate pairs past the sensor pole piece 260 thereby changing the magnetic flux around the sensor coil 261 producing an e.m.f. therein, the magnetic flux changes thus produced are proportional to the torque load and as the armature plates move closer together the magnitude of the magnetic flux changes increase and hence the magnitude of the e.m.f. in the coil 261 increases. When the critical e.m.f. is reached the current flow through a torque sensor actuated solenoid coil 361 is of sufficient magnitude to close the normally open first power boost turbine assembly torque sensor actuated switch 354 thereby energizing a first air-valve control solenoid 362 opening the first air-valve 113 and at the same time closing the first fuel control solenoid actuating switch 358 thereby energizing the first fuel control solenoid 317 and opening the first spring loaded (normally closed) fuel valve 318. This permits fuel to flow into the first burner can 12c via the first fuel line 316a and thence through the first fuel injector plug 268 thereby energizing the first power boost turbine assembly 12 providing power to compensate for the added torque load. Further increases in torque load cause the armature plates to move closer together, as shown typically in FIG. 6 C, and the e.m.f. output of the coil 261 increases further and the current through the torque actuated solenoid coil 361 increases further providing additional pulling power to close the second power boost turbine assembly torque sensor actuated switch 355 while continuing to hold the first torque sensor actuated switch 354 closed. This energizes a second air-valve control solenoid 363 opening the second air-valve 114 and at the same time closes the second fuel control solenoid actuating switch 359 (normally open) thereby energizing the second fuel control solenoid 319 and opening the second spring loaded fuel valve (normally closed) 320. This permits fuel to be injected into the second burner can 13c via the second fuel line 316b and thence through the second fuel plug 268b (not shown but identical to that described for the first injector plug 268), thereby energizing the second power boost turbine assembly 13 providing power to compensate for the added torque load over that which the primary and first power boost turbine assemblies are capable of handling.

When the torque load is reduced, the armature plates 239, 256 move apart and the e.m.f. of the coil 261 drops and when the critical e.m.f. values are reached as the e.m.f. reduces, the reverse actions take place in the electrical control means 120 and the second and first power boost assemblies are returned to their de-energized conditions in succession as the second then the first critical e.m.f. values are reached successively and thereafter the primary turbine provides power exclusively.

All of the turbine assemblies operate at the same rotational velocity. When in the non-operating condition, the first and second power boost turbine assemblies have the air-valves closed and the rotating parts of the compressors and turbines rotate in a near vacuum thereby minimizing power loss due to frictional drag which would occur if air were allowed to flow therethrough at all times.

In the event the torque sensor 14 fails or in the event that additional power greater than that provided by the primary turbine assembly is required immediately, such as full power when starting the vehicle onto which the engine is mounted, the engine is provided with an accelerator pedal means 366 for primarily controlling the throttle valve 305 and for further closing the power over-ride switch 356 through a switch actuating linkage 366a (shown schematically in FIG. 5).

Closing said switch 356 performs the function of over-riding the torque sensor and has the same effect as if the first and second power boost turbine assembly torque sensor actuated switches 354,355 were sequentially closed by the switch 356. Upon closing said switch 356 a first over-ride switch contact 367 and a second over-ride switch contact 368 are sequentially contacted closing the over-ride circuit. This permits a gradual increase (step-wise) in engine power thereby avoiding extreme power surges in power output during closing and opening of the over-ride switch.

The alternator unit 369 portion of the electrical power source is driven by an auxiliary pulley 242 drivingly coupled thereto by a belt drive means 242a (see FIG. 2).

CONSTRUCTIONAL COMMENTS

The materials of construction of the component parts of the engine may be any of the materials used in the construction of turbine engines normally used in fabricating the appropriate parts. The turbine wheel shown and described herein is well suited for ceramic molded fabrication and the fixed vane assemblies are adapted to investment casting using steel alloys capable of withstanding the high temperatures normally used in manufacturing gas turbines, said metals having small coefficients of thermal expansion. The engine sound-suppressing insulation may consist of external insulation plates, such as are normally used as fire wall and under-hood insulation for modern vehicles. In general, the various component parts are interchangeable and therefore the cost of maintenance and replacement of parts such as burner cans, ignition units, turbine parts and valve parts would be relatively low.

The design of the bearing areas is such that cooling may not be required, however, cooling air may be directed against these areas by individual blowers or ram air to increase bearing life.

Engine air for combustion may be pre-heated by the reactors by supplying additional ducts for inlet air flow prior to input into the air cleaner-silencer. Conventional mufflers and antipollution devices may be used with the engine for reducing noise and exhaust pollution respectively.

The detailed description of the preferred embodiment of this invention has referred to a three turbine engine for the purposes of explaining the principles of the invention and is not to be understood as limiting the invention since many modifications may be made by the exercise of skill in the art including, as indicated earlier, one or more primary turbine and one or more power boost turbines, the number being limited only by the size of the engine and the power requirements. The engine would work well with a turbine wheel and the vane assemblies being about 3.5 inches in diameter and with the compressor rotor about seven inches in diameter. Another embodiment of the engine which could be employed would comprise one compressor having the compressor rotor coupled to the primary turbine shaft and the one compressor supplying air to each of the turbine units. With this embodiment an additional valve would be required to assure that air exiting the silencer-cleaner would be sufficient to operate the primary and power boost turbines. A drawback with this embodiment would be in the size of the compressor rotor which would necessarily be larger than would be required where individual compressors are used.

Furthermore, the burner cans are shown as a distinct type herein since these are preferable for this engine, however, any burner can may be used which will perform the function of mixing and igniting an air fuel mixture and directing the resulting high velocity heated gases against the turbine wheel blades of the invention. While the turbine wheel, fixed vane assembly described herein is preferable, any turbine wheel-fixed blade assembly commonly used in turbine engines which could be adapted to this invention could be used. Similarly, while the preferred embodiment and drawings of the invention describe and show an integral unit including the compressor and turbine units, these could be separate and the engine would still be within the scope of this invention.

I claim as my invention:

1. A step-turbine engine comprising in combination:
   a. one or more primary gas turbine assemblies and one or more power boost gas turbine assemblies, said one or more primary turbine assemblies for supplying continuous engine power output when said engine is operating and said power boost turbine assemblies for successively auguenting said primary turbine assemblies as required by engine load conditions, each of said assemblies separately comprising in combination,
      a radial-flow air compressor having an air inlet duct in a compressor housing front member of a compressor housing for admitting air into the compressor and having an outlet duct in the compressor housing rearwardly disposed from the inlet duct and disposed radially therefrom for discharging from the compressor high pressure compressed air therethrough,
      an air-fuel mixture burner can having an air inlet sealably connected to the compressor outlet duct by a duct seal means for directing said high pressure air into a burner can combustion chamber portion having a fuel injection means for injecting fuel thereinto from a fuel delivery means for mixing said fuel with the air therein forming an air-fuel mixture, said chamber further having an electrical igniter means therein, said igniter means being energized by an electrical ignition control means, said igniter means for igniting said air-fuel mixture in said chamber, said can further having a hot gas expansion chamber portion rearwardly disposed from the combustion chamber portion for directing therethrough a high velocity gas ignition product, derived from ignition of the air-fuel mixture, and out thereof through a burner can outlet duct, said outlet duct being sealably connected by a seal clamp means to a gas turbine inlet duct for directing said gas product therethrough into a gas turbine,
      the said gas turbine having said inlet duct coupled to the burner can outlet duct for directing the high velocity gas ignition product into a turbine wheel chamber of a turbine housing and impingingly against a plurality of radially extending turbine blades of a turbine wheel mounted therein for rotating said turbine wheel and a turbine power shaft to which the turbine wheel is fixedly and coaxially mounted, said shaft being rotatably and sealably mounted in sealed bearing and gas seal means at a turbine housing front end and at a turbine housing rearward end, said shaft further being rotatably drivingly coupled at a shaft forward extending end to a compressor rotor of said radial-flow air compressor through a shaft encircling compressor sealed bearing means mounted in a compressor rear housing member, said shaft further having fixedly and coaxially attached on a shaft rearward extending end a gear drive pinion for driving a drive gear of a reduction gear drive assembly, said turbine housing further having spent ignition product exhaust duct means for directing a spent ignition product therethrough and into an exhaust system for discharging said spent ignition product to the atmosphere.

b. the said reduction gear drive assembly having said gear drive pinion of each of the turbine assemblies being rotatably drivingly coupled to the said drive gear portion of said reduction gear drive assembly rotatably mounted within a reduction gear housing, said drive gear being coaxially with and rotatably drivingly coupled to a gear coupling member of a power output drive shaft of said reduction gear drive assembly for delivering rotational power to a rotatable load coupling member of said power output drive shaft, assembly, said drive shaft assembly having a front bearing mounting portion rotatably mounted within a front bearing means, said bearing means being mounted within a front bearing chamber portion of a housing front member, said shaft assembly having a rear bearing mounting portion rotatably mounted within a rear bearing means, said bearing means being mounted within a rear bearing portion of a rear housing member, said reduction gear drive assembly further including a load torque change indicating means for indicating changes in load torque of a load applied to said load coupling member;

c. a power demand sensor means for detecting changes indicated by said load torque change indicating means and converting said changes into an electrical power demand signal and conducting said demand signal to an electrical control means, said electrical control means step-wise successively energizing the one or more power boost gas turbine assemblies for augmenting power output of the continuously energized one or more primary power turbine assemblies as power output requirements increase by opening a fuel valve means in the said fuel delivery system, one valve for each power boost turbine assembly energized, thereby permitting fuel to be injected into the energized power boost turbine assemblies as said assemblies are successively energized in accordance with detected power demand requirements and further for stepwise closing successively said valves in the fuel delivery system as power output requirements are decreased and power augmentation is no longer required;

d. a mounting bar means for mounting compressor housings of each of the said turbine assemblies thereto, said bar further having means for mounting onto a front engine mounting means for front mounting the engine in a vehicle, said turbine housings for each of the turbine assemblies have rear mounting means for fixedly mounting the turbine assemblies to said front gear reduction housing member whereby gear teeth of the said pinion gears are inserted into said housing and mesh drivingly with said drive gear teeth thereby providing for synchronous rotation of rotating parts of said power boost turbine assemblies with rotating parts of said primary turbine assemblies, said reduction gear housing further providing a transmission mounting means on said rear housing member for mounting to a vehicle rear mounting means, and means for coupling said drive shaft coupling member to a conventional vehicle transmission; and e. a starter means rotatingly drivingly coupled to said drive gear for rotating said drive gear for starting the engine upon opening a primary fuel valve of said fuel delivery means and energizing a primary burner can igniter means upon energizing said electrical ignition control means, and said electrical control means.

2. The combination of claim 1 further including a conventional air cleaner-silencer means having one or more air inlet ducts, primary air outlet ducts corresponding with the one or more primary compressors of the one or more primary gas turbine assemblies, and one or more power boost air outlet ducts corresponding with the one or more power boost compressors of the one or more power boost gas turbine assemblies, each of the said air outlet ducts adapted to said compressor air inlet ducts for permitting only filtered air to enter each of the said compressor inlet ducts, said air cleaner-silencer for filtering said air and for reducing compressor noise produced by the rotating compressor rotors, said primary compressors having intermediate each primary compressor air inlet duct and said primary air outlet duct of the cleaner-silencer means an air preheater means for heating air entering the said primary compressors during an engine start-up period, and said power boost compressors having intermediate each power boost compressor air inlet duct and said power boost air outlet duct corresponding thereto an open-close valve means for closing off air flow into said power boost compressors when said power boost turbine assemblies are in a stand-by condition and not providing power augmentation to the primary turbine assemblies and opening air flow into said power boost compressors when energized to provide power augumentation to the primary turbine assemblies, said preheater means being controlled by said electrical control means and said open-close valve means being controlled by said power demand sensor means and said electrical control means, said sensor means generated signal actuating said control means for opening said air valves step-wise successively when said fuel valves are step-wise successively opened as described, said air valve means, when in a closed position, thereby shutting off air flow into said compressors and thereby providing for rotation of said power boost compressor rotors and said turbine wheels in a low ambient pressure, said ambient pressure being substantially below atmospheric pressure within said compressor housings and turbine housings respectively for minimizing parasitic drag on said rotating parts when rotating while said power boost assemblies are in an un-energized condition.

3. The combination of claim 2 limited to one primary turbine assembly and first and second power boost turbine assemblies, said front gear reduction housing member having on a front surface thereof a top rear mounting flange having a primary turbine rear flange fixedly and sealably attached thereto, a lower right rear mounting flange having a first power boost turbine rear flange fixedly and sealably attached thereto, and a lower left rear mounting flange having a second power boost turbine rear flange sealably and fixedly attached thereto, said mounting flanges being spaced at 120° intervals, said primary assembly having the primary compressor axially aligned with said primary turbine, and first and second power boost compressors being axially aligned with first and second power boost turbines respectively, said compressor housings being attached to said mounting bar and being oriented such that compressor air inlet ducts are spaced at 120° intervals and having the primary compressor inlet duct, the first power boost compressor inlet duct, and the second power boost inlet duct respectively in axial alignment with respective rear mounting flanges, said primary, first power boost, and second power boost compressors and turbines each respectively having common turbine wheel-compressor rotor shafts.

4. The combination of claim 3 wherein the burner cans have respective inlet ducts inserted into respective compressor outlet ducts having seal ring means therebetween for permitting forward and rearward expansion movement of the burner cans within said compressor outlet ducts while maintaining a compression seal between said ducts for directing compressed air only into the burner cans from respective air compressors, said burner cans disposed in substantially horizontal alignment with adjacent respective gas turbine assemblies to which said burner cans are attached.

5. The combination of claim 4 wherein each of said burner can assemblies comprise an elongate circular tubular jacket encircling a combustor liner, said liner being in concentric spaced apart relationship to said jacket and internal thereto, said jacket having said front air inlet adapted to be sealably inserted into said compressor air outlet duct, as described, and having opposite thereto said high velocity heated gas outlet duct, said liner and jacket having a plurality of elongate narrow radial heat transfer ribs intermediate and in touching relationship with the combustor liner and said jacket for maintaining relative concentricity therebetween and providing a liner heat sink means, said jacket and liner having said fuel injector plug means removably fixedly and sealably inserted through a jacket and liner fuel injection plug insertion opening, said plug having a fuel outlet end opening into said air-fuel-mixing-combustion, said opening and plug inserted thereinto being positioned forwardly in the liner and rearwardly from said air inlet for injecting fuel from said fuel delivery means into said combustion chamber, said jacket and liner further having said air-fuel mixture ignitor plug means similarly inserted into said combustion chamber through a jacket and liner igniter plug opening separated angularly from the injector plug means, said igniter means for igniting the air-fuel mixture in said combustion chamber, said combustion chamber portion having an air inlet shield means within said can located rearwardly from and being coaxially with the burner can air inlet, said shield means having a plurality of small air inlet holes therein for admitting a primary air portion of compressed air pumped from the compressor into said chamber forward of the fuel injector and igniter plug means, said chamber having an internal diffuser rearwardly from the fuel injector and igniter plug means having a diameter less than a liner diameter and equal to or greater than the diameter of said air inlet for directing therethrough and out thereof said ignition product into a hot gas expansion chamber portion, said liner having a plurality of small holes rearwardly from said combustion chamber portion for admitting a dilution air portion into said liner for effecting substantially complete combustion of said air-fuel mixture within said liner, said liner having rearwardly from said hot gas expansion chamber portion a necked down venturi chamber portion for drawing said dilution air thereinto as a high velocity ignition product gas flows therethrough, and further having located rearwardly therefrom and being further necked down, the said outlet duct connected to said turbine inlet duct as described, said compressed air flows into the burner can through the can inlet and said primary air portion flows into said combustion chamber portion through said small holes in said shield and said air mixes with fuel injected thereinto through said fuel injector plug means and the resulting air-fuel mixture is ignited therein by the igniter plug means and forms said ignition product gas, said gas flowing out thereof through said diffuser into said expansion chamber portion, said dilution air portion flows laminarly through an air flow space between the jacket and liner and into said liner through said plurality of small holes therein, said expanded ignition product gas flows through said venturi chamber portion further drawing compressed air thereinto, said air further aiding in combustion of said ignition product gas, said gas thereafter flows out thereof through said outlet duct and into the turbine housing through the turbine inlet duct as described.

6. The combination of claim 5 wherein said injector plug opening and said ignitor plug opening are located in a same circular plane and are angularly separated in said circular plane.

7. The combination of claim 5 wherein the said plurality of holes rearwardly from the said combustion chamber portion each has an outwardly bent rear edge and an inwardly bent front edge for improving flow of air therethrough into the said expansion and venturi chamber portions of said liner.

8. The combination of claim 1 wherein said primary exhaust duct means includes a heat exchange heater encircling a can outside surface around said expansion chamber portion of each of the burner cans of each of the one or more power boost gas turbine assemblies for transferring heat from the primary turbine spent ignition product into said power boost can expansion chamber portion through a can wall defining said expansion chamber as said spent ignition product flows out of said one or more primary turbines while said turbines are operating, said exchange heater being interposed between the primary spent ignition product exhaust outlet of the one or more primary turbines and said exhaust system.

9. The combination of claim 5 wherein said primary exhaust duct means includes a first burner can heat exchanger and a second burner can heat exchanger encircling the said outside surface of the burner cans around said expansion gas chamber portion of said first and second burner cans and each of said burner cans heat exchangers comprising a rectangularly shaped annular tube slip-fittingly-removably encircling said expansion chamber portion, said said tube having an inlet duct for sealably connecting to a primary turbine exhaust duct by clamp means, there being one of said primary exhaust ducts for each heat exchanger, and an outlet duct for sealably connecting to said exhaust system by exhaust system clamp means, said heat exchanger being disposed between said primary turbine exhaust duct and said exhaust system on said power boost burner cans, said cans being in horizontal alignment with each of the respective power boost compressor-turbine assemblies.

10. The combination in claim 5 wherein said igniter means comprises a modified conventional spark plug means, said modification comprising an extension of a hot spark central lead extending outwardly from and in coaxial alignment with a central spark plug lead for extending said spark lead into a central portion of said combustion chamber portion when said igniter is mounted in said burner can, said extended lead for providing a heat retainer and diffuser for aiding combustion of the said air-fuel mixture within said chamber portion.

11. The combination in claim 10 wherein said electrical ignition control means comprises a conventional reluctor controlled capacitor discharge amplifier means having a constant speed reluctor drive motor for driving said reluctor at a constant speed for controlling a spark energy input to an ignition coil means at a constant discrete rate, said coil means having output leads connected to said igniter spark plug means for delivering said spark energy to said spark plug igniter means at said constant rate determined by the constant speed reluctor drive motor, said capacitor discharge amplifier means being energized by a conventional battery-alternator means.

12. The combination of claim 11 wherein said ignition coil means has a common iron core, a common primary winding connected conductively to said capacitor discharge means, and three step-up windings insulated from each other and said primary winding, said primary and secondary windings having a common ground connected to said spark plug means case, and said secondary windings each having a high voltage lead connected to said spark plug means hot lead for conducting high voltage current thereto and thereby developing a sparking voltage between said hot lead and said spark plug ground lead within said combustion chamber portion of said burner cans.

13. The combination in claim 11 wherein said constant spark rate is any rate within a range of from four sparks per second to ten sparks per second.

14. The combination in claim 5 wherein said igniter means comprises a modified conventional glow plug, said modification comprising said glowplug having a central electrically hot lead insulated from a plug case by a high temperature insulator, said hot lead having a coaxially outwardly extended central lead portion extending outwardly from a case base and being fixedly and electrically conductively connected to a resistive ground lead at a connection point in close proximity to a plug case end, said ground lead being fixedly and electrically conductively attached to said plug case end portion, said ground lead and central lead providing a resistive heater element when electric current flows therethrough, said extended portion extending into said combustion chamber central portion when the glow plug is mounted in said burner can thereby providing a heat diffuser means within said chamber portion to aid in combustion of the air-fuel mixture therein.

15. The combination in claim 14 wherein said electrical ignition control means comprises a current limiting resistor network having one resistor for each glow plug, said resistors being conductively connected to said centrally hot glow plug lead by a lead wire means, and each of said resistors thereafter being connected in parallel opposite said glow plug connection at a resistor connecting terminal, said terminal further being conductively connected to an on-off switch contact of an on-off glow plug control switch means, for completing an electrical circuit from said resistors to a conventional automotive electrical power source when said switch means is in an "on" position.

16. The combination of claim 5 wherein said fuel injector plugs each comprises a housing having a barrel section and a filter retaining section, said barrel section defining therewithin a fluid flow filter containing chamber, said filter retaining section having a filter retaining enclosure means within said said chamber for sealably and detachably mounting a forward filter end of a fluid filter thereinto and having a continuous inlet passage through a fluid inlet line coupling portion of said filter retaining section, said inlet passage opening into said chamber at said forward filter end within said filter retaining enclosure means, said barrel section having a continuous outlet fluid passage through a burner can coupling portion opposite said inlet coupling portion, said burner can coupling portion for sealably and detachably mounting said plug in said burner can injector opening, said burner can coupling portion having said fluid outlet passage therethrough communicating between said fluid flow chamber and the burner can combustion chamber portion, said outlet passage terminating in a fluid nozzle for reducing fluid flow therethrough to a fine stream or mist for fluid flowing into said combustion chamber portion.

17. The combination in claim 9 wherein said fuel delivery means for controlling fuel delivery from a conventional fuel tank means to said burner cans comprises in combination:

a fuel flow inlet manifold having a manifold fuel inlet sealably connected to a fuel inlet turbine line for delivering a fluid fuel from said tank means to a manifold fuel chamber through said manifold inlet, said manifold fuel chamber communicating with a fuel reservoir through a fuel rotary pump driven by a constant speed electric pump motor, said pump motor operating when a motor ignition switch is turned to an "on" position, and a normally closed spring loaded pump by-pass valve, said by-pass valve for opening a pump by-pass line when a fluid fuel pressure within said reservoir, produced by said rotary pump continuously pumping fuel thereinto from said manifold fuel chamber, increases above a by-pass valve closing force supplied by a spring member of said spring loaded by-pass valve, said by-pass valve for permitting fuel to by-pass said rotary pump, when open, in an amount proportional to the pressure above said valve closing force within said reservoir, and the said fuel reservoir having a primary turbine burner can fuel outlet conduit, a first power boost turbine burner can fuel outlet conduit, and a second power boost turbine burner can fuel outlet conduit, each of said conduits having outlets thereof connected to respective primary, first, and second burner can inlet lines for delivering fuel to said primary, first, and second fuel injector plugs, each of said fuel outlet conduits having at a reservoir end thereof a normally closed fuel flow solenoid controlled valve, there being a primary solenoid controlled valve, a first solenoid controlled valve, and a second solenoid controlled valve, said valves for opening said outlets upon energizing valve control solenoids of said valves, said solenoids being individually energizable by said electrical control means as described, said outlets having disposed between said solenoid controlled valves and said conduit outlets a throttle valve means having a rotatable common fluid control valve means for controlling the amount of fuel flowing through the three outlet conduits simultaneously when fluid flows therethrough upon opening any or all of the said solenoid controlled fuel valves, said throttle valve further having a lever means for rotating said rotatable common fluid control valve means, said lever means adapted for connecting to a remote manually controlled accelerator pedal means, said conduits further having disposed between said throttle valve and a fuel line connecting outlet a fuel outlet idler adjustment valve for limiting fuel flow therethrough for setting an engine idle speed;

when said ignition switch is turned on, said primary solenoid is energized and fuel flows out through said primary outlet into said primary burner can thereby energizing the primary turbine;

when the sensor means demands additional power output, the first fuel control solenoid and a control solenoid for said first open-close air valve of said first compressor are energized and fuel and air flow into the first burner can thereby energizing the first power boost turbine;

when said sensor further demands additional power output, the second fuel control solenoid and a second control solenoid for the second open-close air valve of said second compressor are energized and fuel and air flow into the second burner can thereby energizing the second power boost turbine as described, as said sensor demands reduced power successively the reverse sequence occurs sequentially until engine power output requires only that produced by the primary turbine, said throttle valve means for providing power variations within the limits of the turbine assemblies placed in operation within a range of torque load requirements wherein a next higher power incremental step is not required.

18. The combination of claim 9 wherein said first and second power boost turbines each have a front exhaust duct and a rear exhaust duct and further wherein said exhaust system includes first and second reactor means, said first reactor means being disposed between and communicating between said conventional vehicle exhaust system and the said first burner can heater exhaust duct and said first power boost turbine front and rear exhaust ducts, said second reactor means being disposed between said conventional vehicle exhaust system and said second burner can heater exhaust duct and said second power boost turbine front and rear exhaust ducts, said first and second reactor means having air inlet means for drawing air into said reactor for reacting with spent ignition product exhaust flowing through said reactor means.

19. The combination in claim 18 wherein each of said exhaust reactor means comprises an elongate cylindrical tube exhaust reactor central portion having a necked-down primary air-primary-exhaust mixing front portion connected to a primary exhaust inlet venturi assembly having a primary exhaust duct coupling flange thereon, said central portion further having rearwardly disposed thereon a necked-down exhaust outlet portion terminating in an exhaust outlet having an exhaust pipe connecting flange thereon, said central portion having disposed rearwardly from said front necked-down portion a power boost turbine front exhaust duct inlet and disposed rearwardly therefrom a power boost turbine rear exhaust duct inlet said power boost turbine duct inlets each having within an exhaust reaction chamber enclosed by said central portion and adjacent said inlets a heat-retaining exhaust-diffusing member for improving exhaust-to-air reaction within said chamber, first venturi assembly further comprising an exhaust venturi tube having on a front end thereof said inlet flange and rearward said flange being enclosed within an outer tubular member forming therebetween an air distribution chamber, said outer member having extending outwardly therefrom an air inlet tube for permitting air to be drawn into said air distribution chamber therethrough, said venturi tube having a venturi exhaust outlet forwardly disposed and in close proximity to said mixing front portion for producing a venturi action when primary exhaust flows therethrough thereby drawing air into said air distribution chamber and thereafter mixing said air with primary exhaust in said mixing front portion and thereafter with power boost turbine exhaust in said central exhaust reaction chamber for reacting air and exhaust gases therewithin forming a mixture of air and reacted exhaust gases, said mixture thereafter flowing out through said reactor outlet.

20. The combination in claim 19 wherein said primary air preheater means comprises an insulator circular-shaped body having a pre-heater mounting flange means extending radially outwardly therefrom for sealably and mateably mounting said body to the primary compressor inlet duct flange, said body having a central air passage opening portion coaxially aligned, when mounted, with the primary compressor inlet air duct and the air cleaner-silencer primary air outlet duct and having insulatingly fixedly mounted within said central air passage opening an electrical heating element for heating air flowing through said opening into the primary compressor when the element is energized, said element having a plurality of two or more electrically conductive leads connected thereto radially passing sealably and insulatingly from said opening through a body wall of said circular-shaped body and extending outwardly therefrom being electrically conductively connected to a solenoid controlled pre-heater on-off switch by solenoid switch connecting leads, said pre-heater for heating air flowing into said primary compressor during an engine start-up period for improving combustion of fuel within the primary burner can during said start-up period, said solenoid controlled switch being actuated for turning said heater "on" when said ignition switch is in a start position.

21. The combination of claim 20 wherein said solenoid controlled normally-closed open-close air valves controlling air flow into said first and second compressors each comprise separately front and rear housing members defining a valve chamber having a pivotably plate valve therewithin, said plate valve being fixedly attached at a lower end to a plate valve actuator shaft, said shaft being rotatably mounted in front and rear housing member pivot bearings, said shaft further having a shaft extended portion extending outwardly from one of the two housing members and having mounted on said shaft extended portion a valve pinion gear member of a solenoid controlled rack and pinion gear means, said gear means having gear teeth meshing with rack gear teeth of a rack gear member of said solenoid controlled rack and pinion gear means, said plate valve being held in a normally closed position by a closing spring means thereby closing an air flow-through passage extending through said front and rear housing members, said housing members having air seal means internal to said chamber and encircling said air passage for sealing against said plate valve when in the closed position, said air flow-through passage being in coaxial alignment with said compressor inlet duct of the compressor to which said valve is mounted by flange mounting means thereon mateable with said compressor inlet flange, said solenoid controlled rack and pinion gear for pivotably opening said plate valve by swinging said plate valve away from said air pasage when a solenoid member of said solenoid controlled rack and pinion means is energized when said sensor means signal calls for energizing the respective power boost turbine thereby allowing air to flow into the respective compressor, said valve when in the closed position shutting off an air flow into said respective compressor and thereby maintaining air pressure within the respective turbine assembly substantially below atmospheric pressure when rotating parts of the engine are rotating.

22. The combination of claim 21 wherein said radial-flow compressor comprises said front and rear housing members sealably bolted together by compressor fastening bolt means thereby defining an air flow-through chamber having a compressor rotor fixedly mounted on a compressor-turbine common rotatable shaft, said shaft being rotated by said turbine when said engine operates, said compressor rotor comprising a rear solid rotor wheel portion having a front surface curving upwardly from a wheel edge to a wheel central portion toward a front housing member inner surface, said wheel having on said curved front surface a plurality of thin forwardly extending perpendicular radial air inducer blades being equidistantly spaced around said wheel front surface, said blades having upper blade edges curving upwardly from a relatively short blade heighth at a blade wheel edge portion to a greater height at a blade central portion being concentrically aligned with the wheel central portion and disposed outwardly from a wheel maximum heighth, said upper blade edges having a blade edge radius of curvature smaller than a wheel front radius of curvature, said blade having a downwardly tapering portion beginning at a blade edge maximum heighth portion and tapering to said wheel central portion and terminating near the wheel center, said tapering portion being curved-over in a scrollike manner toward a rotor rotation direction, and said curved blade edge being curved-over in said scroll-like manner beginning at said maximum blade heighth portion and extending outwardly therefrom for about one-half the distance to the blade wheel edge portion, said curved-over portion being curved in the direction of rotor rotation, said blade central curved-over portions forming an air scoop air inducer rotor portion for drawing air into the compressor through the compressor inlet, when the rotor rotates, the said housing front member inner front surface is in close proximity to the curved upper blade at the blade wheel edge portion and has a radius of curvature less than the blade upper edge radius of curvature, said inner surface being further from the blade edge central portion than at said blade wheel edge portion, said front member inner surface thereby forming a rotor shroud, said wheel has a relatively flat rear surface having on a central portion thereof a shaft mounting means, said rear housing member inner surface and said rear wheel surface and the wheel edge defining an air collection chamber therebetween, said rear member having said air outlet duct as described.

23. The combination in claim 22 wherein said compressor rear housing member has in a central portion thereof a forward shaft bearing housing having mounted therein a sealed permanently lubricated shaft bearing sealably and bearingly encircling said shaft, said rear housing member having extending rearwardly from said bearing housing and being integral with said rear housing member a rearwardly extending elongate cylindrical shaft extension housing having axially located therewithin a turbine shaft forward extending portion of said shaft, said shaft extension housing having on a rear portion thereof a compressor-to-turbine mounting flange mounted by bolt means to a turbine-to-compressor mounting flange portion of said turbine housing front end.

24. The combination in claim 23 wherein each of said turbine housings include a front turbine housing member, a central turbine housing member and a rear turbine housing member, said forward central and rear housing members being sealably bolted together with turbine housing bolt means thereby forming said turbine housing, said housing defining therewithin a cylindrical turbine chamber having a front exhaust collector portion defined by said front housing member, said front housing member having an exhaust duct therein for discharging said spent ignition product exhaust therefrom and directing said exhaust into said exhaust system, said front housing member having rearwardly from said collector chamber and adjacent to a chamber central portion a front fixed vane cylindrical mounting chamber portion having a front fixed vane assembly shrink fittingly fixedly mounted therein, said front vane assembly having a plurality of scroll shaped front vanes disposed radially and equidistantly about a front vane central annular support member, said support member encircling in non-touching relationship said shaft, said turbine chamber further having, defined by said rear housing member and being adjacent to and rearward from said a central chamber portion, a rear fixed vane cylindrical chamber portion having shrink fittingly fixedly mounted therein a rear fixed vane assembly, said rear fixed vane assembly identical to said front vane assembly except being mounted such that the rear vane assembly is disposed in mirror image relationship to the front vane assembly, said rear housing member further defining a rear exhaust collector chamber portion having a rear exhaust duct in said rear housing member for discharging from said rear collector chamber portion a portion of said spent ignition product exhaust into said exhaust system, said central housing member defining said turbine wheel chamber having said turbine wheel mounted on said shaft therein and having said inlet duct as described, said turbine blades having a quarter-moon shape and being oriented in horizontal alignment with a shaft longitudinal axis and having blade concave portions aligned for impingement of said ignition product high velocity gas thereon as said turbine wheel rotates past said turbine inlet, said vane assemblies having said scroll shaped vanes adjacent to and in non-touching relationship with said blades, said vanes having concave vane portions facing opposite a direction of gas flow into said turbine wheel chamber for providing additional thrust to said turbine wheel blades when said high velocity ignition product gas first impinges upon said turbine blades and thereafter being directed by said blades impinging upon said concave portion of said scroll shaped vanes, said gas thereafter being directed by said vanes into said exhaust collector chamber and thereafter being discharged therefrom as described.

25. The combination of claim 24 including said reduction gear drive assembly having said reduction gear housing, said drive gear, said power output drive shaft assembly, and said load torque change indicating means wherein a. said drive gear is circular and comprises an outer forwardly extending annular gear ring portion having gear teeth distributed uniformly around an outer circumference thereof, a forwardly extending annular central shaft mounting portion and having disposed between rear portions of said ring gear portion and said shaft mounting portion and being integral therewith a thin relatively flat plate portion, said plate portion having two forwardly extending torque sensor load spring rear holding blocks fixedly mounted thereon intermediate an inner surface of said outer ring portion and an outer surface of said central annular portion, said holding blocks being spaced diametrically apart on said plate portion, said central shaft mounting portion having an inner wall defining a power output shaft opening, said opening encircling a shaft slide bearing means mounted between said inner wall and a slide bearing mount portion of said drive shaft assembly for permitting said drive gear to rotate freely about said drive shaft, said gear ring portion having on a front surface thereof a plurality of rear torque sensor armature plates disposed incrementally and uniformly around said ring front surface extending forwardly therefrom, and wherein b. said drive shaft assembly comprises a one piece unit bearingly mounted within the assembly housing as described, having a front cylindrical auxiliary drive shaft portion forwardly extending from the front housing member and having an auxiliary drive means mounted thereon for driving said conventional alternator means and accessory means requiring power drive, and having rearwardly disposed from said front bearing mounting portion, said mounting portion being mounted in said front bearing, an annular drive gear coupling plate member integral with said shaft extending radially outwardly therefrom, said coupling plate having integral therewith a peripheral rearward extension dimensioned to mate in nesting non-touching position internal to said gear ring portion of said drive gear and in non-touching position with respect to said drive gear plate portion, said coupling plate having adjacent to and rearwardly therefrom said slide bearing mount portion of said shaft, said slide bearing mount portion being encircled by said slide bearing, said coupling plate having adjacent to and inwardly disposed from said rearward extension two rearwardly extending torque sensor load spring rear holding blocks being in circular alignment with said drive gear spring rear holding blocks, and being spaced on the gear coupling plate diametrically apart and further being disposed about 90° circumferentially apart from said rear holding blocks, said front and rear holding blocks being torsionally biased against each other by torque sensor load springs thereby allowing rotational power to be transferred through said springs from the drive gear to the coupling plate and permitting limited rotational movement of said drive gear with respect to said coupling plate depending upon torque load force variations of the load applied to said load coupling member of the shaft by a load coupled thereto, said load coupling plate further having extending outwardly from a coupling plate periphery a plurality of front torque sensor armature plates disposed incrementally uniformly around said periphery and being mateable in non-touching close proximity with said rear armature plates when aligned therewith, said drive gear rotating coaxially with said shaft about a shaft axis when said engine operates, each member of said plurality of said front armature plates being disposed an angular distance away from a mating rear armature plate member of said plurality of rear armature plates when no torque load is applied to said shaft and when the torque load is sufficient to overcome a torque sensor load spring biasing force, the angular distance is reduced in proportion to the torque load force, said shaft further has rearward the slide bearing a drive gear holding washer encircling said shaft for holding said drive gear in said nesting position and extending rearwardly from said washer is located said rear bearing mount means encircled by the rear bearing mounted within the rear housing member, said load coupling member of said shaft extending rearwardly therefrom;

the said biasing torque load springs, said front and rear armature plates comprising said torque load indicating means and said angular separation of said armature plates is used to indicate the amount of torque load force applied to the shaft load coupling member.

26. The combination of claim 25 including said power demand sensor means for detecting changes in said angular distance between said mating rear and front armature plates, said sensor means comprising a horseshoe type permanent magnetic having exposed north and south pole pieces and a sensor pick-up coil, said pick-up coil encircling a magnet closed end and a space between north and south pole pieces having a coil pole piece end adjacent to said north and south pole pieces, said magnetic pick-up being mounted on a front surface of the gear reduction front housing member over a sensor means magnetic pole pieces insertion opening having said north and south pole pieces inserted therethrough, said north and south pole pieces being in parallel alignment with and being perpendicular to said front and rear armature plates as each member of said plurality of said armature plates rotates past said pole pieces when the engine is operating, said rotation of said armature plates causing a change in a magnetic field surrounding said pick-up coil thereby inducing a sensing current therein, said magnetic field changing as the angular distance between the armature plate pairs change thereby causing a change in sensing current being proportional to the torque load on the power output drive shaft load coupling member, said sensing current being conducted to said electrical control means by sensor output leads for energizing the electrical control means.

27. The combination in claim 26 further including an over-speed control magnetic pick-up as described for said sensor means and said over-speed pick-up being mounted on said front surface of said front housing member over an over-speed magnetic pole pieces insertion opening having said north and south pole pieces of said over-speed control inserted therethrough, said pole pieces being positioned to align with over-speed control activation slots and activation webs between said slots, there being a plurality of said slots uniformly spaced around said drive gear coupling plate on a circle having a web intermediate each adjacent slot, said slots and webs for developing changes in an over-speed magnetic pick-up magnetic field between the north and south pole pieces as the said plate rotates and the webs and slots move past the pole pieces in succession, said variations in magnetic field further inducing in said over-speed coil an over-speed control current proportional to the rotational velocity of said plate, said current being conducted to said electrical control means and being in series with an over-speed control solenoid of an over-speed solenoid controlled switch portion of said electrical control means, when said over-speed control current increases above a critical value determined by a maximum desired rotational velocity of said plate a switch portion of said solenoid controlled switch opens and the primary, first power boost and second power boost fuel control switches are caused to close thereby shutting down the engine until the rotational velocity is reduced below the said critical value.

28. The combination in claim 26 including said electrical control means comprising in combination;
   a. a conventional automotive electrical power source for supplying electrical energy to said control means;
   b. a manually operated off-start-run starter switch having an off position for de-energizing the electrical control means and placing the engine in a non-operating condition, a start-run position for simultaneously energizing engine starting circuit components and engine running circuit components, and a run position for maintaining engine running circuit components in an energized condition and de-energizing said starting circuit components, said switch further having accessory switching means for energizing accessory circuits of said engine;
   c. said starting circuit components including a starter switching means for energizing the starter motor and the primary compressor air pre-heater during engine start-up;
   d. said running circuit components including the fuel pump motor, the electrical ignition means and control means therefor, the solenoid control valves for the fuel delivery means, and a sensor actuated solenoid controlled switch for switching power to first and second power boost air valves and fuel control valves when the said sensing current delivered by the torque sensor pick-up coil is sufficient to actuate a sensor actuated solenoid therefor;

said electrical control means upon being energized by placing said starter switch in a start position such that the starter motor engages the drive gear and rotates the turbine pinion gears meshing therewith and hence the turbine shaft and accordingly the compressor and turbine units, the igniter means is energized simultaneously therewith as is the primary fuel control valve and the said air pre-heater thereby causing said air-fuel ignition product to impinge against the primary turbine wheel placing the engine in an operating condition, thereafter said starter switch is placed in the run position thereby deenergizing said starter motor and air pre-heater and placing the engine in a running condition, as a torque load is applied to the power output drive shaft coupling member and as the torque load increases to a first critical value, sensor current flowing through the sensor coil and solenoid coil of the sensor actuated solenoid controlled switch closes a first power boost actuating switch and the first power boost fuel valve is opened simultaneously with the first power boost air inlet valve and the first power boost turbine is thereupon energized augmenting power of the primary turbine, as the torque load is further increased to a second critical value, additional current flowing through said sensor coil and said solenoid coil of said sensor actuated solenoid controlled switch reaches a magnitude sufficient to close a second power boost actuating switch thereby energizing the second power boost fuel valve and the second power boost air inlet valve and fuel and air flow simultaneously into the second power boost burner can thus placing the second power boost turbine in an operating condition and further augmenting primary turbine power, as the torque load decreases below each of said second and first critical values, the said valves are closed in succession and the engine power output returns to that produced by the primary turbine.

29. The combination in claim 28 further including a foot controlled accelerator means mechanically coupled to the throttle valve of the fuel delivery means and further coupled to a power over-ride switch, said over-ride switch for over-riding the torque sensor actuated solenoid of the sensor actuated solenoid controlled switch by closing a first over-ride switch upon nearly completely depressing said accelerator means thereby energizing said first power boost turbine assembly as described by by-passing said first power boost switch, and upon completely depressing said accelerator means energizing said second power boost turbine as described by by-passing said second power boost switch.

* * * * *